US011237637B2

(12) United States Patent
El Dokor et al.

(10) Patent No.: US 11,237,637 B2
(45) Date of Patent: Feb. 1, 2022

(54) GESTURE RECOGNITION SYSTEMS

(71) Applicant: Edge3 Technologies LLC, Phoenix, AZ (US)

(72) Inventors: Tarek A. El Dokor, Phoenix, AZ (US); Joshua T. King, Mesa, AZ (US)

(73) Assignee: Edge 3 Technologies, Phoenix, AZ (US)

( * ) Notice: Subject to any disclaimer, the term of this patent is extended or adjusted under 35 U.S.C. 154(b) by 369 days.

(21) Appl. No.: 15/236,511

(22) Filed: Aug. 15, 2016

(65) Prior Publication Data

US 2017/0045950 A1 Feb. 16, 2017

Related U.S. Application Data

(63) Continuation of application No. 12/784,123, filed on May 20, 2010, now Pat. No. 9,417,700.

(60) Provisional application No. 61/180,351, filed on May 21, 2009.

(51) Int. Cl.
  *G06F 3/01* (2006.01)
  *G06K 9/00* (2006.01)
  *G06K 9/32* (2006.01)
  *G06K 9/46* (2006.01)

(52) U.S. Cl.
  CPC ......... *G06F 3/017* (2013.01); *G06K 9/00335* (2013.01); *G06K 9/3216* (2013.01); *G06K 9/4671* (2013.01)

(58) Field of Classification Search
  CPC .............................. G06F 3/017; G06K 9/00335
  See application file for complete search history.

(56) References Cited

U.S. PATENT DOCUMENTS

| | | | | |
|---|---|---|---|---|
| 5,699,441 A | * | 12/1997 | Sagawa | G06F 17/2872 382/100 |
| 2003/0132950 A1 | * | 7/2003 | Surucu | G06F 1/1626 715/700 |
| 2005/0210417 A1 | * | 9/2005 | Marvit | G06F 1/1613 715/863 |
| 2007/0283296 A1 | * | 12/2007 | Nilsson | G06F 3/017 715/863 |
| 2010/0063813 A1 | * | 3/2010 | Richter | G06F 3/014 704/231 |
| 2010/0103092 A1 | * | 4/2010 | Hsieh | G06F 3/017 345/156 |

* cited by examiner

*Primary Examiner* — Kenneth Bukowski
(74) *Attorney, Agent, or Firm* — Gordon Kessler

(57) ABSTRACT

A method and apparatus for performing gesture recognition. In one embodiment of the invention, the method includes the steps of receiving one or more raw frames from one or more cameras, each of the one or more raw frames representing a time sequence of images, determining one or more regions of the one or more received raw frames that comprise highly textured regions, segmenting the one or more determined highly textured regions in accordance textured features thereof to determine one or more segments thereof, determining one or more regions of the one or more received raw frames that comprise other than highly textured regions, and segmenting the one or more determined other than highly textured regions in accordance with color thereof to determine one or more segments thereof. One or more of the segments are then tracked through the one or more raw frames representing the time sequence of images.

18 Claims, 22 Drawing Sheets

GESTURE RECOGNITION SYSTEMS

CROSS REFERENCE TO RELATED APPLICATIONS

This application is a continuation of U.S. patent application Ser. No. 12/784,123 filed May 20, 2010, to El Dokor et al. titled Gesture Recognition Systems and Related Methods, which in turn claims the benefit of U.S. Provisional Patent Application Ser. No. 61/180,351 filed May 21, 2009, to El Dokor et al., titled Gesture Recognition Systems and Related Methods, the contents of these applications being incorporated herein by reference.

FIELD OF THE INVENTION

This invention relates generally to implementations of gesture recognition systems, and more particularly to gesture recognition systems and methods employing machine vision and computer-aided vision systems and methods.

BACKGROUND OF THE INVENTION

Machine vision systems generally include an image source, such as a camera, for retrieving an image of a subject, such as a person, coupled with a computer system. Many system implementations receive images from the image source, process them using the computer system, and utilize the computer system to implement various methods to determine whether a user being observed by the image source is using portions of his or her body to make particular actions or form particular shapes, or gestures. The computer system then associates the observed gestures with executable commands or instructions. Machine vision systems that analyze the images for gestures are referred to as gesture recognition systems.

Various implementations of gesture recognition systems, implementations of methods of gesture recognition, and implementations of methods of generating a depth map are presented in accordance with the present invention. The inventors of the present invention, however, have determined that many presently available gesture recognition systems are insufficient in their ability to recognize gestures and provide such recognition for subsequent processing.

Therefore, it would be desirable to provide an apparatus that overcomes the drawbacks of the prior art.

SUMMARY OF THE INVENTION

Gesture recognition systems provided in accordance with the present invention may be used in a wide variety of operating contexts and locations. For example, a gesture recognition system according to one or more embodiments of the present invention may be utilized to observe individuals standing by a wall of a building on which an interface has been projected. As the individuals move their arms, the system observes the gestures, recognizes them, and executes commands using a computer associated with the gesture recognition system to perform a variety of tasks, such as, by non-limiting example, opening a web site, saving files to a storage device, opening a document, viewing a video, viewing a picture, searching for a book, or any other task that a computer may be involved in performing.

In another situation, an implementation of a gesture recognition system in accordance with one or more embodiments of the present invention may be incorporated into or in the bezel of a laptop computer above the screen area, or in any other conveniently located position on such a laptop or other computing or mobile device. In this position, when the computer is in operation and the user is in the field of view of the image camera being used to view the user's actions, gesture recognition may be used to enable the performance of various tasks on the laptop screen like those previously discussed. Particular implementations of gesture recognition systems may also be developed to enable individuals with limited motor coordination or movement, or physical impairments, to be able to interface with or utilize a computer, by using certain predefined gestures and/or watching the movement of particular portions of the user's body.

Gesture recognition systems in accordance with one or more embodiments of the present inventions may be employed in a wide variety of other use environments, conditions, and cases, including by non-limiting example, to enable interactive video game play or exercise, in kiosks to allow individuals to get information without touching a screen, in vehicles, in interactive advertisements, to guide aircraft or other vehicles directly or remotely, enable physical skill training exercises, provide secure access to controlled areas, or any other situation or location where allowing a user to communicate through actions would facilitate human/system interaction.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
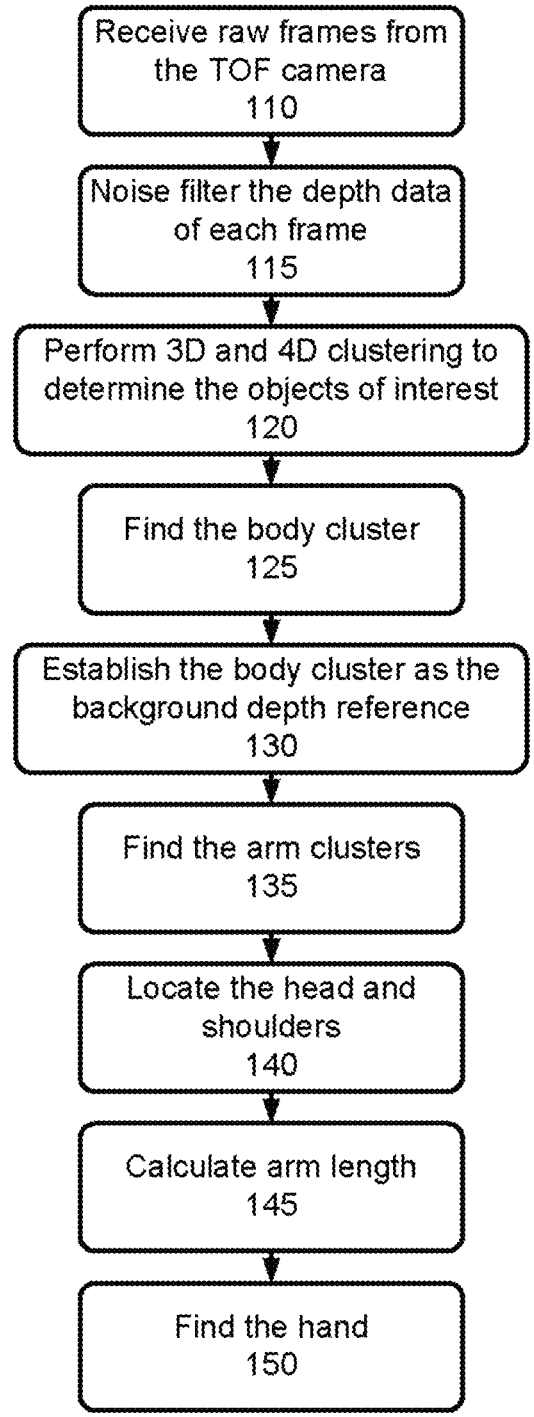
FIG. 1 is a flowchart diagram depicting a method of gesture recognition in accordance with an embodiment of the present invention.

The invention will now be described making reference to the following drawings in which like reference numbers denote like structure or steps. Referring first to FIG. 1, an implementation in accordance with an embodiment of the present invention of a method of generating a depth map using a time-of-flight (TOF) sensor is illustrated, details of many of the steps presented in FIG. 1 being described in greater detail in later figures. Such a TOF sensor is adapted to provide a distance from the camera to a particular object or objects during each frame or sampling time. As is shown in FIG. 1, first at step 110 raw frames may be received from a TOF sensor or camera. These images are preferably of a user whose gestures are being interpreted, but may also comprise any moving system having motion that is to be interpreted in accordance with the system of the invention.

Figure 2:
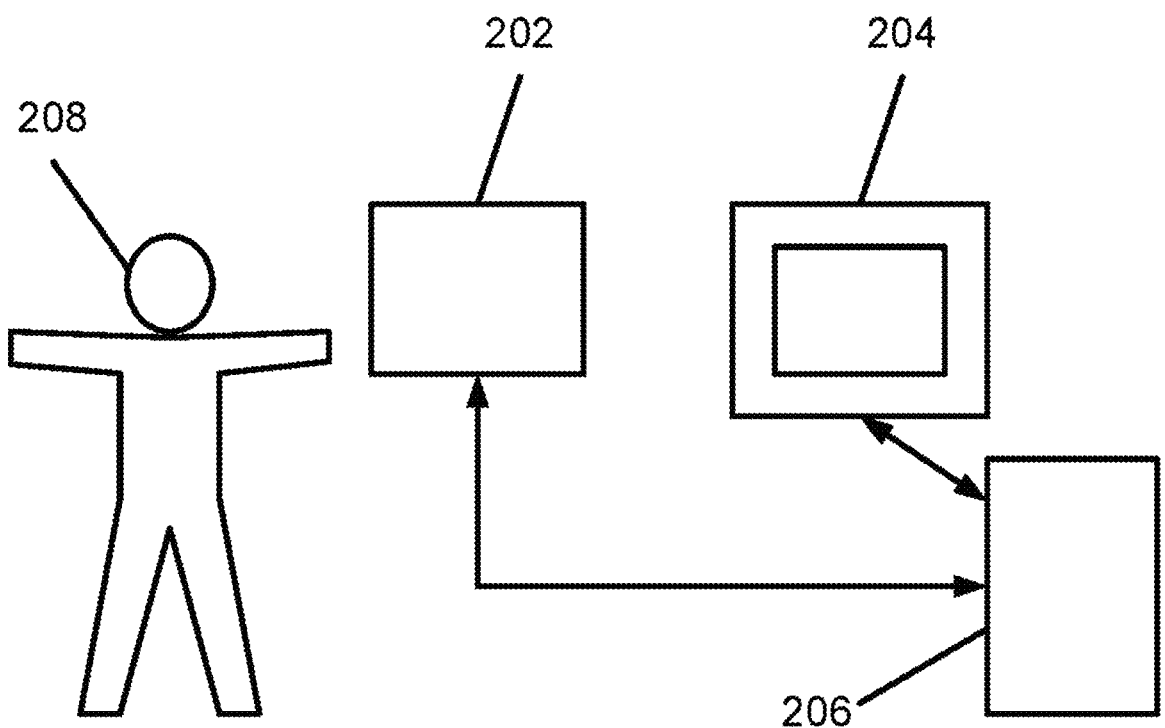
FIG. 2 is a diagram depicting an implementation of an embodiment of the present invention.

FIG. 2 illustrates an implementation of such a system for obtaining the images of the user from the TOF camera in accordance with an embodiment of the invention. As is shown in FIG. 2, the system preferably includes a TOF sensor or camera 202 that is configured to measure the distance to a person or other object to be analyzed 208 being viewed by the TOF sensors across a pixel array. While the actual operation of various implementations of TOF sensors and cameras varies, generally, the person or other object 208 is painted by a non-visible light source emitted by the TOF sensor 202 and the time taken for reflected light to return and be sensed by a photosensitive array within the TOF sensor 202 is measured. Using the speed of light and the characteristics of the components of the TOF sensor 202, the TOF sensor 202 is able to calculate the distance to the various parts of the person 208 being viewed, pixel by pixel, returning "images" composed of frames that are depth maps of the scene within the field of view of the TOF sensor 202. The contours of the person 208 will appear in each frame because the person's contours are at a different distances from the TOF sensor 202 than the background. TOF sensors used in various implementations of gesture recognition systems presented in accordance with this invention may be manufactured by a wide number of companies including Canesta, Centre Suisse d'Electronique et de Microtechnique SA (CSEM), or 3DV Systems, or any other similar system. The frames including the depth data are received by a computer 206, which is coupled with display 204. While a single computer 206 and display 204 are shown, one or more client computers, servers, databases, or any combination of client computers, servers, or databases with any number of displays may be included in particular implementations of the system.

Referring back to FIG. 1, when the frames are received by the computer 206 of FIG. 2, they may be referred to as "raw" frames, since no other processing beyond the capability of the TOF sensor or camera 202 has occurred. The remaining steps of FIG. 1 relate to a method of creating a depth map for use in a gesture recognition system. Thus, next, at step 115 of FIG. 1, depth data (distance of one or more objects in the frame from the TOF camera) of each of the raw frames may be noise filtered so that the system may determine at which depth (distance away from the TOF camera) the user or other object to which the gesture recognition system is to be applied. This is important so that upon such a determination the system can focus movement at approximately the determined distance from the TOF camera, and can determine that other movement taking place substantially in the foreground or background from the determined distance can be ignored by the gesture recognition system of the invention. Generation of such depth data will be described in greater detail below.

At a next step 120 of FIG. 1, three dimensional (3D) or four dimensional (4D) clustering (also relative to time) may be performed to determine the objects of interest. Thereafter, at step 125 a body cluster of a current user may be found, and is then established as a background depth reference at step 130. Processing then passes to step 135, where the user's arm clusters may be found, and to step 140 where the user's head and shoulders may be identified. Finally, at step 145 the user's arm length may be calculated, and the user's hand may be located and identified at step 150. Steps 135-150 may be repeated as necessary for any other body parts that may be desirable for one or more particular applications. As is used in the method, a cluster is a group of pixels or an area in the frame that includes depth data with a desired contour or with similar depth values that indicate that an object, like the person's body, arm, or hand is located there. A discussion of various filtering and clustering methods is included in U.S. patent application Ser. No. 12/784,022 to El Dokor, titled "Systems and Related Methods For Three-Dimensional Gesture Recognition in Vehicles," filed May 20, 2010, the disclosure of which is hereby incorporated entirely herein by reference.

Once the frames have been processed and clustering and locating the various body portions has been completed, implementations of TOF camera-employing gesture recognition systems may utilize implementations of any of the gesture recognition methods in accordance with this invention to process the resulting depth maps generated in accordance with the invention. When one or more gestures performed by an imaged individual are recognized, this individual 208 can execute and interact with the computer 206 or any other system in communication with computer 206 and may also provide feedback to the individual 208 through display 204.

Figure 3:
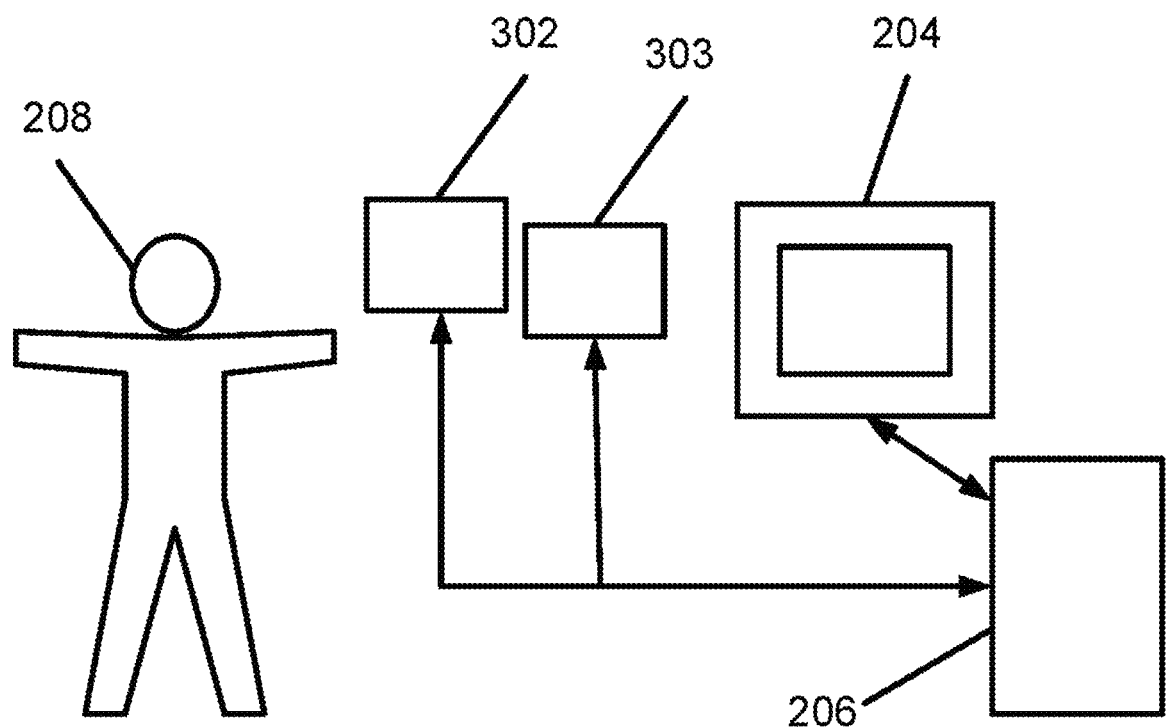
FIG. 3 is a diagram depicting an implementation of an embodiment of the present invention.

Referring next to FIG. 3, an additional embodiment of the present invention for implementing a stereoscopic gesture recognition system is illustrated. As illustrated, the system includes a first camera 302 and a second camera 303 that observe the individual 208 from two distinct viewpoints, or stereoscopically. The first camera 302 and the second camera 303 are coupled with computer 206 which receives images in the form of frames from both the first camera 302 and second camera 303. The first camera 302 and second camera 303 can be of the same camera type/model/manufacturer or of any different kind of types/models/manufacturers in particular implementations. Performance may be enhanced, however, when both cameras are of the same type, model, and manufacturer, or are of similar specifications so that they may work together. Examples of cameras that may be used in particular implementations of gesture recognition systems employing stereoscopic configurations include, by non-limiting example, web cameras, digital camcorders, Electronic News Gathering (ENG) video cameras, Electronic Field Production (EFP) cameras, Charge Coupled Devices (CCDs), Complementary Metal-Oxide Semiconductor (CMOS) photodiodes, or any other device capable of gathering a plurality of images of a scene. In additional particular embodiments of the invention, inexpensive CMOS web cameras mounted on a surface of display 204, or mounted otherwise on the display or other user computing or mobile device, may be utilized. As the person 208 moves into or is in the field of view of the first camera 302 and the second camera 303, these cameras send collected image information to the computer 206, which processes the input and carries out gesture recognition, implementing one or more actions visible to the person on the display 204. Any of the actions previously disclosed may be taken in response to a recognized gesture.

Figure 4:
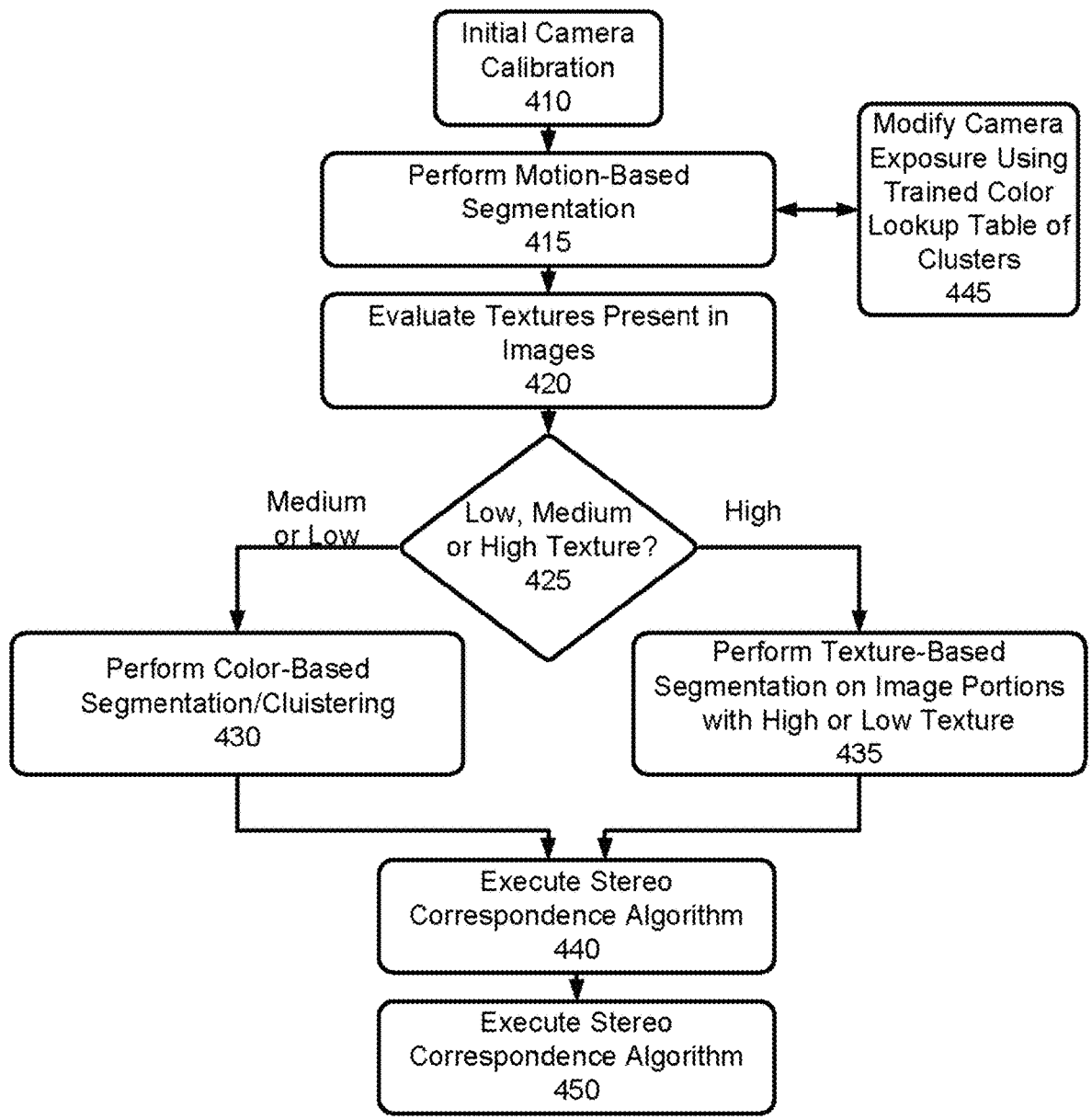
FIG. 4 is a flowchart diagram depicting an embodiment of the invention for generating depth maps.

Referring next to FIG. 4, a flowchart of an embodiment of the invention comprising an overall process of generating a depth map of a scene using a stereoscopic camera configuration is illustrated. The method of this embodiment may include a first initial camera calibration step 410 that generally is implemented when the cameras are first installed in a particular location. A wide variety of methods and systems may be employed to complete the initial calibration process, which ultimately serves to determine what the image capture and optical characteristics of the two cameras are, including such parameters as, by non-limiting example, lens aberration, photodetector characteristics, distance between camera centers, image capture parameters, lighting parameters, exposure compensation values, or any other camera or image capture parameters. In particular implementations of the present invention, the initial camera calibration step may need to be performed only once when the gesture recognition system is installed or setup in a particular location for the first time. In other implementations of the present invention, some or all of the initial camera calibration steps performed at initial startup may be performed each time the gesture recognition system is activated or powered up.

As is then shown in FIG. 4, the method of this embodiment of the invention may also include performing motion-based segmentation on the images received from both cameras at step 415, and then evaluating textures present in the images that have been segmented at step 420 to determine at step 425 whether there are regions of high, medium or low texture within the images. If the inquiry at step 425 determines that there are one or more regions within the images of medium or low texture, then at step 430 the method of the invention may include performing color-based segmentation/clustering on the pixels in the one or more regions including medium of low texture. If it is determined at step 425 that the images include one or more regions of high texture characteristics, then at step 435 the method of the invention may include performing texture-based segmentation on these image regions. Thereafter, at step 440, a stereo correspondence algorithm may be executed. In a particular embodiment of the invention, at step 445, a camera exposure may be modified using a trained color lookup table of clusters in response to motion-based segmentation step 420 as an aid in obtaining better depth data for the clusters. The resulting information from each segmented region identified in the segmentation and/or evaluation process, and after execution of the stereo correspondence algorithm, is then combined to form a completed depth map at step 450. These steps noted in FIG. 4 will be discussed in greater depth below. After the processed depth maps have been completed at step 450, the resulting depth image frames are ready for processing by any of the methods of gesture recognition disclosed in accordance with the present invention.

Figure 5:
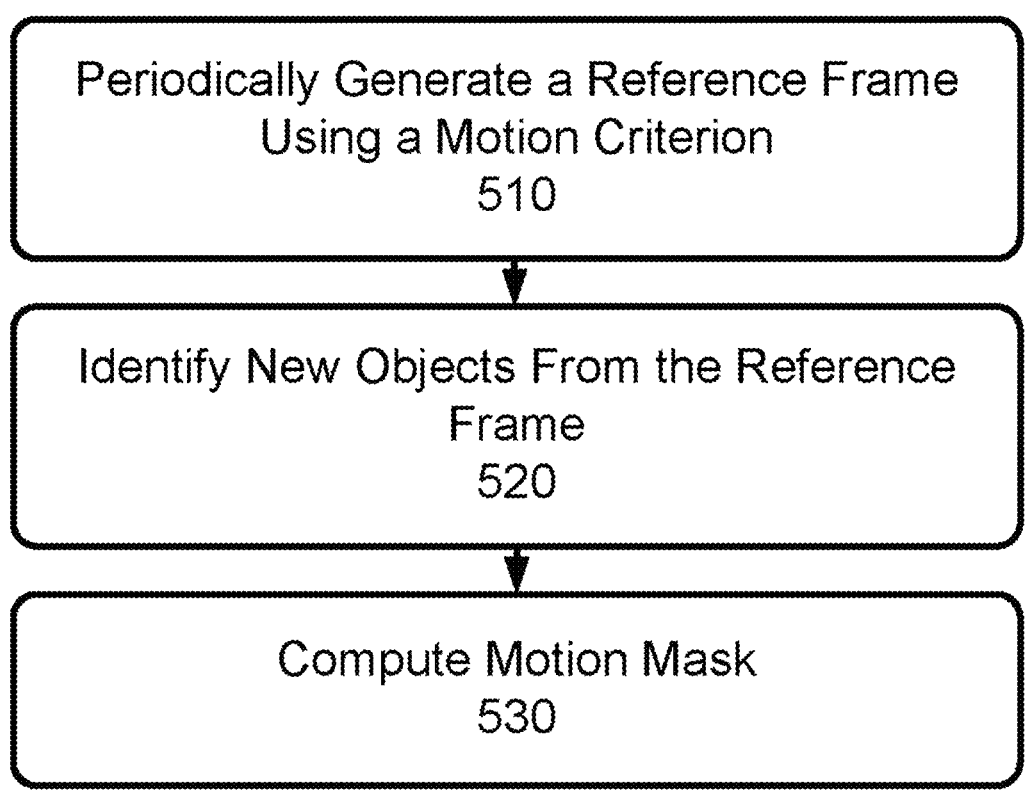
FIG. 5 is a flowchart diagram depicting an embodiment of the invention for generating motion masks.

Referring next to FIG. 5, a flow chart of a method of a motion-based segmentation in accordance with an embodiment of the invention is illustrated. As illustrated, the method includes the steps of periodically generating a reference frame using a motion criterion at step 510. The frequency at which a reference frame is generated may depend upon the level of motion of the subject in the field of view of the camera. In particular implementations in accordance with the present invention, the motion criterion used may permit adaptive generation of reference frames; in others, the motion criterion may be a threshold value (such as the number of changed pixels from one frame to another) that acts as a trigger to generate a new grayscale reference frame. In particular implementations, color frames may be used.

Next, at step 520 the reference frame may be used to identify new objects in the image by subtracting the reference from a current frame from one of the cameras. When the reference frame is subtracted from the current frame, all of the pixels that include information that has not changed in the current frame from the reference frame are zeroed out or take on null values. The process may sometimes be called background subtraction. The remaining pixels represent areas in the frame which correspond to changes in the image from the time of the current frame to the time of the reference image, which changes are generally apparent because an object or person has been moving since the time the reference image was taken. Finally, at step 530, the resulting portion of the image is thresholded and used to compute a motion mask, or area of interest within the image where depth values will be calculated.

Once a motion mask has been created and the areas or regions within the images that are changing as a result of motion have been identified, implementations of gesture recognition systems in accordance with the present invention may utilize methods of evaluating the texture of the regions of the images within the motion mask and of segmenting within the regions based on differences in their texture. By "texture" is meant a particular pattern of lighter and darker pixels within a particular area or region of the frame or image. For example, a highly-textured region would be an area where half of the pixels were white and half were black and the black pixels were arranged in parallel lines across the region. An example of a very non-textured region would be one where practically all the pixels were white or black, or the same or very similar colors.

Figure 6:
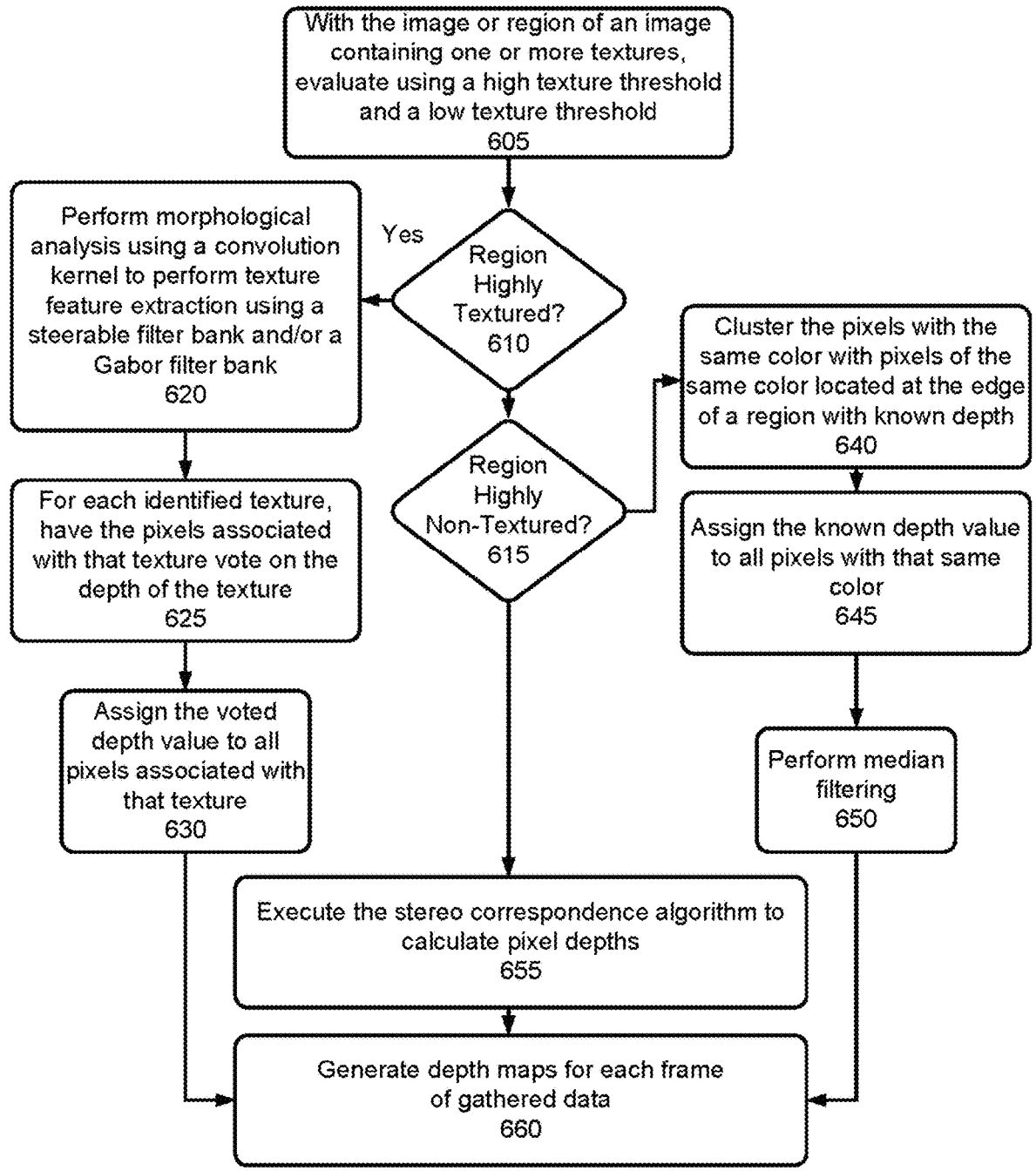
FIG. 6 is a flowchart diagram depicting an alternative embodiment of the invention for generating depth maps.

Referring next to FIG. 6, a method of evaluating regions of different texture within a motion mask area in accordance with an embodiment of the invention is illustrated. In accordance with one or more embodiments of the invention, either the entire motion mask area may be analyzed, or portions of the motion mask area may be separately analyzed. The analysis of the texture may proceed at step 605 by comparing the detected textures with a high texture threshold and a low texture threshold. Any of a wide variety of texture evaluation and comparison methods and algorithms may be utilized including those disclosed in accordance with this invention to detect and/or perform the texture analysis and the comparisons with the texture thresholds. Thus, at step 610 it may be queried whether the area (entire or partial) is highly textured, or has a texture level equal to or above that of the high texture threshold. If this query is answered in the affirmative, and therefore it is determined that the area is highly textured, processing passes to step 620 and implements a method for morphologically analyzing the area using a convolution kernel to perform texture feature extraction, preferably employing a steerable filter bank and/or a Gabor filter bank. Additional processing proceeds at step 625, for each identified texture, the pixels associated with that texture vote on the depth of the texture, and at step 630 the voted depth value is associated to all pixels associated with that texture. Implementations of such methods will be discussed subsequently in this document.

If at step 610 it is determined that the area is not highly textured, then processing passes to step 615 where it is queried whether the area of the image is very non-textured. If this inquiry is answered in the affirmative, and it is determined that the area of the image is very non-textured when compared to a low texture threshold, then processing preferably passes to step 640 to implement a method of block-based median filtering and color-based clustering including clustering the pixels within the same color with pixels of the same color located at the edge of a region with a known depth. Then, at step 645, the known depth values is assigned to all pixels with that came color, and at step 650, median filtering is performed. This method will also be discussed subsequently in greater depth.

If at step 615 it is instead determined that the area of the image is not very non-textured, and therefore falls between the high texture threshold and the low texture threshold, processing preferably passes to step 655 where a stereo correspondence algorithm may be executed directly on the pixels in the area or image being evaluated to determine the pixel depths thereof.

Finally, in accordance with the invention, regardless of the path followed to generate the pixel depths, one or more depth maps may be generated. In some embodiments of the invention, all three methods may be employed one or more times for each motion mask region being analyzed to generate a portion of the depth map. When two or more of the methods are used to analyze portions of the area, the resulting depth map portions formed are joined together to form a depth map of the entire area for the particular frame or image within the motion mask area. Each of these methods will be discussed in greater detail in the following sections.

Figure 7:
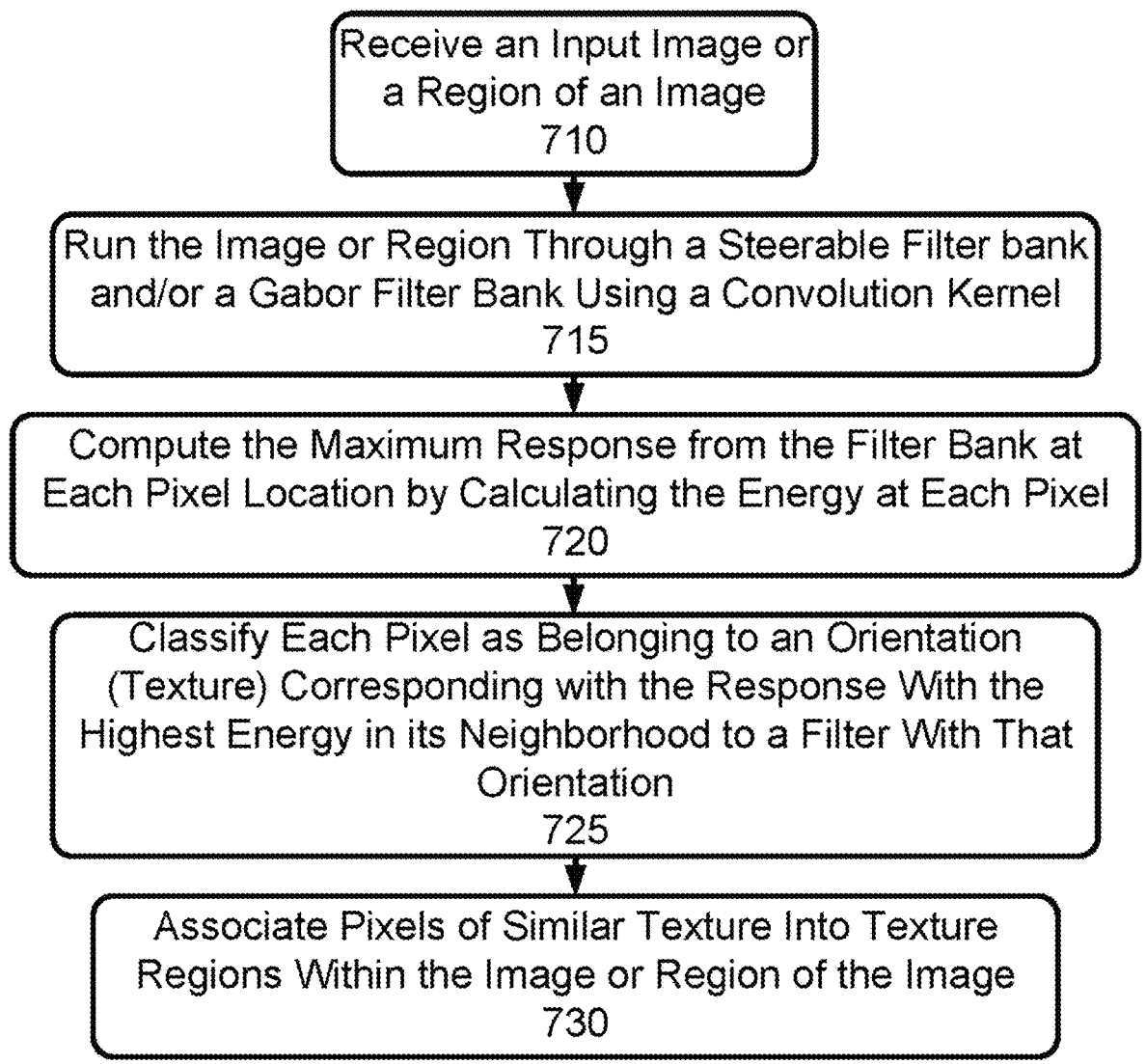
FIG. 7 is a flowchart diagram depicting an embodiment of the invention for generating texture regions.

Referring to FIG. 7, an implementation of a method of morphologically analyzing an area using a convolution kernel to perform texture feature extraction in accordance with an embodiment of the invention is illustrated. The method includes a first step 710 of receiving an input image or region of an image and running (or processing) the image or region through a steerable filter bank and/or a Gabor filter bank using a convolution kernel in step 715. In particular implementations, the step of running the image or region through a steerable filter bank may be implemented as a software kernel adapted to run on a Compute Unified Device Architecture (CUDA) enabled computer architecture platform, the details of which will be discussed later in this document. The method may also include computing the maximum response from the filter bank at each pixel location by calculating the energy at each pixel at step 720, and classifying each pixel as belonging to an orientation (texture) corresponding with the response with the highest energy in its neighborhood to a filter with that orientation at step 725. Finally, at step 730, the method may also include associating pixels of similar texture into texture regions within the image or region.

As noted in FIG. 6, the method presented in accordance with the present invention includes the step of taking each identified texture region and having pixels associated with that texture vote on the overall orientation associated with the texture and assigning the voted orientation to all pixels associated with that texture in steps 625 and 630. This aids in the texture-based segmentation process. While such voting is illustrated as the preferred implementation of the invention shown in FIG. 6, any of a wide variety of methods and algorithms for determining and/or using a summary statistical values may be utilized to determine what depth value should be associated with a particular texture region. These may include, by non-limiting example, median values, average values, least squares estimates, or any other method or statistic capable of determining the mode of a dataset.

Figure 8:
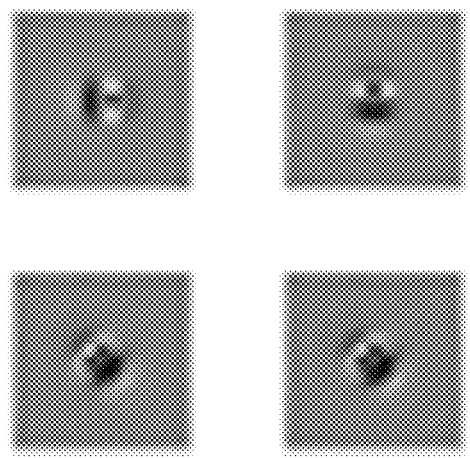
FIG. 8 depicts steerable filter bank in accordance with an embodiment of the invention.
Figure 9:
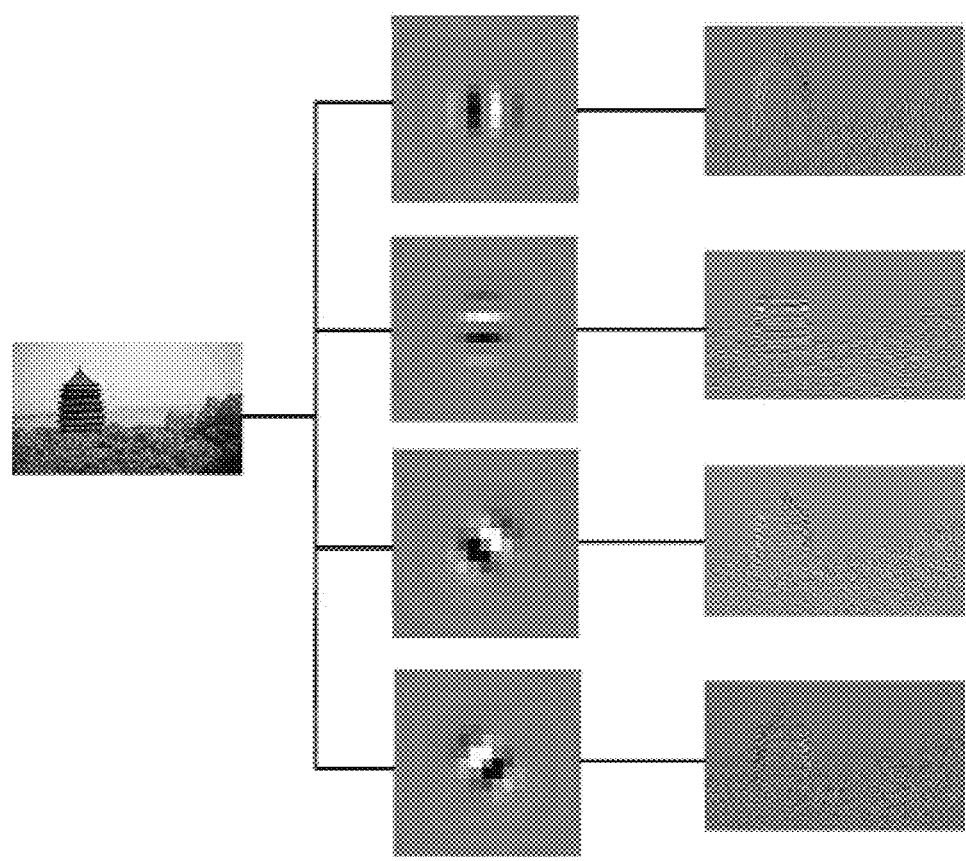
FIG. 9 depicts the outputs created by convolving the four filters illustrated in FIG. 8 with a grayscale image in accordance with an embodiment of the invention.

An example of a noted steerable filter bank in accordance with an embodiment of the present invention is set forth in FIG. 8. As is shown in FIG. 8, the steerable filter bank may perform frequency decomposition using four orientation subbands, horizontal, vertical and two diagonals. Multiscale versions of such a filter bank may also be used. When such a filter bank is convolved with the image, which may be performed utilizing a convolution kernel, the maximum response from the filter bank at each pixel is computed. The computation is carried out by calculating the energy at each pixel, which is the square of the filter response coefficients. A visual example of the outputs created by convolving the four filters illustrated in FIG. 8 with a grayscale image (where the diagonal filters are +45 and −45 filters) is illustrated in FIG. 9.

In particular implementations presented in accordance with the present invention, as noted in step 620, a Gabor filter bank may also be used in place of a steerable filter bank. Relevant teachings and disclosure concerning the structure, function, implementation, and methods of using steerable filter banks and Gabor filter banks for texture segmentation and processing may be found in the following references, each of which is incorporated herein by reference in its entirety: W. T. Freeman, et al., "The Design and Use of Steerable Filters," IEEE Transactions of Pattern Analysis and Machine Intelligence, v. 13, p. 891-906 (September 1991); E. P. Simoncelli, et al., "Shiftable Multi-scale Transforms," IEEE Transactions on Information Theory, v. 38, p. 587-607 (March 1992); E. P. Simoncellie, et al., "The Steerable pyramid: A Flexible Architecture for Multi-Scale Derivative Computation," Proceedings of ICIP-95, v. 3, p. 444-447 (October 1995); and J. Chen, et al., "Adaptive Perceptual Color-Texture Image Segmentation," IEEE Transactions on Image Processing, v. 14, No. 10, p. 1524-1536 (October 2005).

Figure 10:
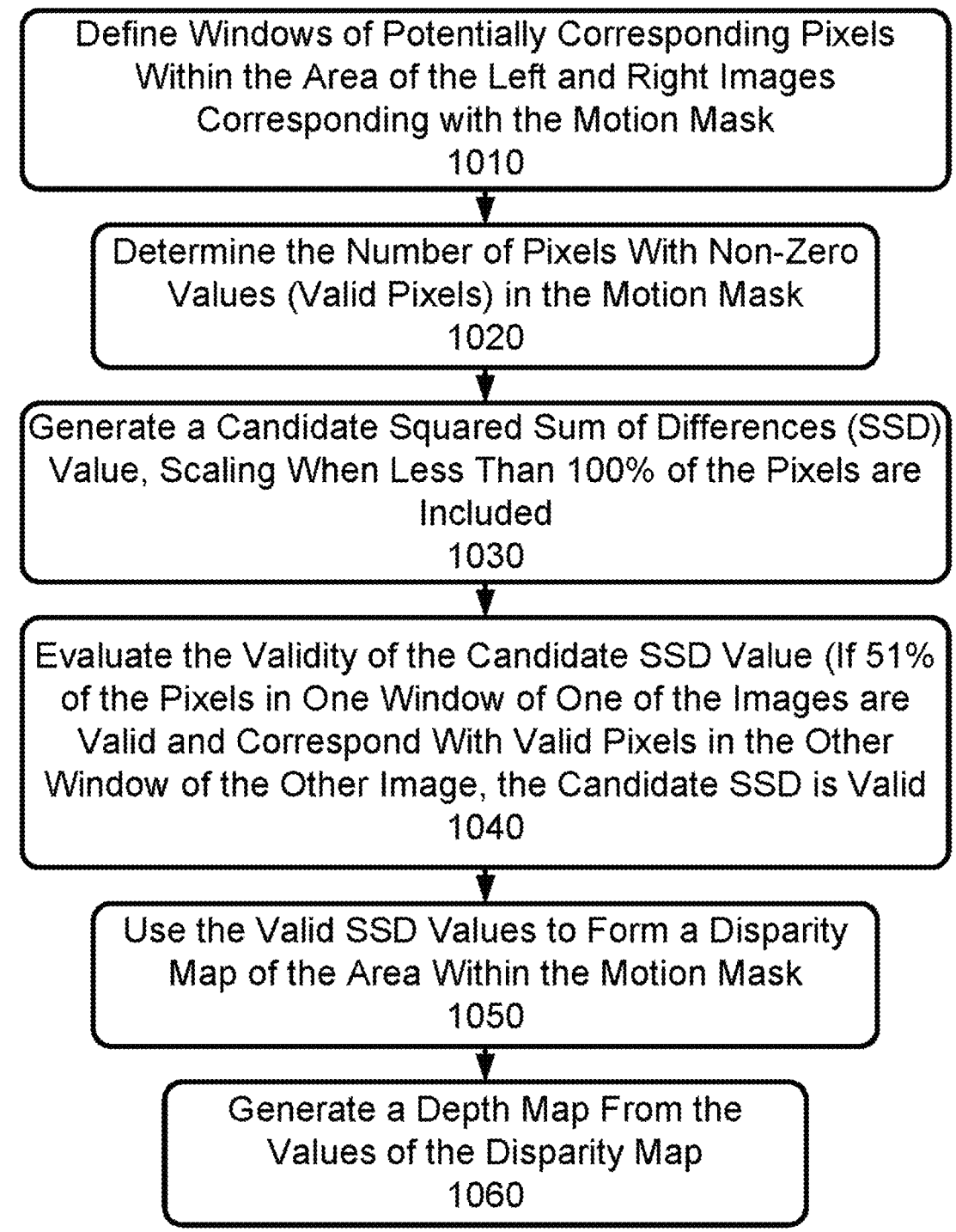
FIG. 10 is a flowchart diagram depicting an alternative embodiment of the invention for generating depth maps.

Referring next to FIG. 10, an embodiment of the present invention comprising a stereo correspondence algorithm presented is illustrated. In this particular preferred embodiment, while all pixels within the motion mask area may all be directly used for depth map generation; in alternative embodiments of the invention, a further condition or filter may be applied that ensures that disparity values (which are used to calculate depth values) are only determined for pixels that have non-zero values in the mask (or mask area). Each of these embodiments may help reduce the probability that a depth value will be calculated using improperly paired pixels from the two stereo images.

Each pixel in the depth map generated from a stereoscopic camera configuration contains information from a pixel in a left image and a corresponding pixel in a right image where both pixels are viewing the same point in the scene. The two corresponding or paired pixels may be located using a stereo correspondence algorithm as shown in step 1010. As is further illustrated in FIG. 10, the stereo correspondence algorithm may include defining windows of potentially corresponding pixels within the area of the left and right images that correspond with the motion mask. A squared sum of differences (SSD) value may then be calculated for each pixel to enable the calculation of a disparity value, which is subsequently used to calculate a depth value for each pixel. In another method, left and right images are subtracted from each other, per instance of time. Disparity decomposition is then attempted based on a predefined similarity metric.

In particular embodiments of the present invention, at step 1020, the method may include determining the number of pixels with non-zero values (valid pixels) in the motion mask. The method further includes processing at step 1030 so the SSD value may be scaled based on the percentage of valid differencing operations according the following equation (because less than 100% of the pixels in the window were used for the calculation):

$$SSD_S = SSD\left(\frac{(2R_h + 1)(2R_v + 1)}{N_d}\right) \quad (1)$$

where $SSD_s$ is the scaled SSD value, $R_h$ is the horizontal window radius, $R_v$ is the vertical window radius, and $N_d$ is the number of valid differencing operations used to calculate the SSD.

In particular embodiments of the invention, at step 1040, the SSD value may be considered a candidate SSD value and evaluated to determine its validity. The validity of the candidate SSD value may be determined if at least 51% of the pixels in one window are valid and correspond with valid pixels in the other window. Any of a wide variety of other criteria and other percentages could also be used to determine the validity of a candidate SSD value in particular implementations.

Once the SSD values have been determined, at step 1050 they are used in calculations to generate a disparity map of the area within the motion mask. With the values in the disparity map at step 1060, a depth map is calculated using any of a wide variety of known methods and techniques. The foregoing method may be used directly to form depth maps or portions of depth maps directly from the image data.

Implementations of many, if not all, of the methods presented in accordance with the present invention may be carried out on a computer as software programmed in a wide variety of languages. Any of a wide variety of computer hardware platforms, processor types, operating systems, and telecommunication networks may be involved in carrying out various method steps. In a particular implementation, the processor being used may be a graphics processing unit (GPU) such as those manufactured by NVIDIA® Corporation of Santa Clara Calif. The software instructions utilized to carry out the various method steps may be programmed in a CUDA environment, which is a term used to described both the computer architecture manufactured by NVIDIA® that currently support C language programming. Accordingly, something being "programmed in CUDA" means that the code may be written in any language supported by the CUDA architecture, which generally includes a massively multithreaded computing environment including a many 21 cored processor. Because the stereo correspondence and any of the other methods disclosed in this document may be implemented in CUDA on the GPU, the processing load of the central processing unit (CPU) may be substantially reduced, and may enable gesture detection with stereo cameras in real time at 70-80 frames per second.

Figure 11:
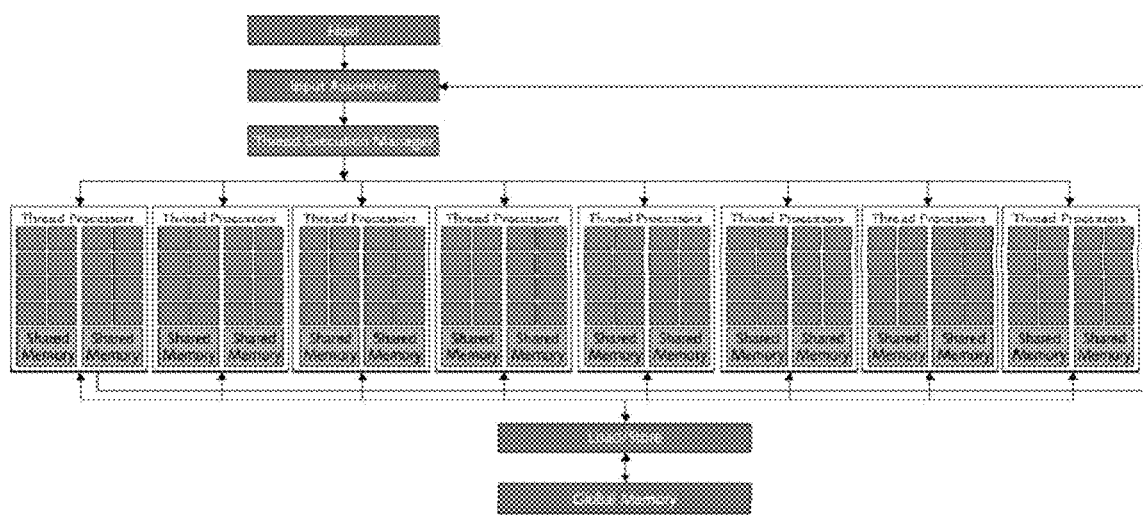
FIG. 11 is a block diagram of the system architecture of an NVIDIA® GeForce® 8 graphics processor.

Referring to FIG. 11, a block diagram of the system architecture of an NVIDIA® GeForce® 8 graphics processor that is structured to support the CUDA, taken from FIG. 2 of "Parallel Processing with CUDA," by Tom R. Halfhill, Microprocessor Report (Jan. 28, 2008) available at http://www.nvidia.com/docs/IO/55972/220401_Reprint.pdf, the disclosure of which is hereby incorporated by reference. As is illustrated in FIG. 11, a large number of thread processors are included, each of which utilizes data stored in shared memory for processing. Because the data is stored in shared memory on board the GPU itself, the data is accessible to each of the thread processors simultaneously, allowing for both rapid access and parallel processing of the same data across multiple threads at the same time. A large number of threads can be executed concurrently by each of the thread processors; in the architecture example in FIG. 11, for example, 12,288 threads may be concurrently executed.

In particular embodiments in accordance with the invention, when any method or structure presented in accordance with the present invention are implemented using CUDA on a GPU, any, all, or some of the methods may be programmed to operate asynchronously and scalably. Each method and or section of a method and/or group of methods may be applied separately, and may serve as its own compartmentalized compute device. In particular embodiments in accordance with the present invention, no actual main thread may be used from which child or derived threads are run. Instead, the entire method and/or section may be run in separate threads all interfacing with the CPU for input/output. In these implementations, the resulting scalability may ensure that the overall execution of the method(s) and/or sections does not slow down should a specific method(s) and/or section require more time to execute on the GPU.

Figure 12:
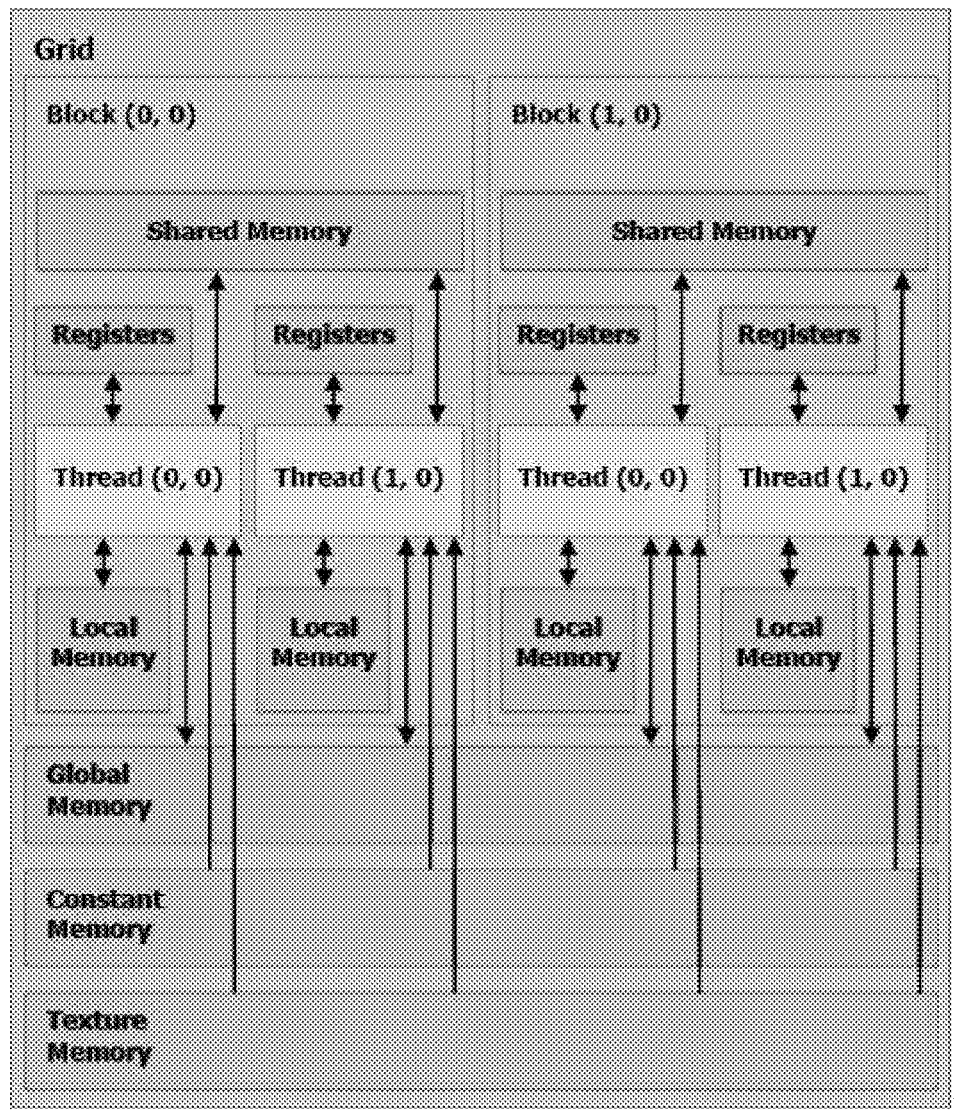
FIG. 12 is a block diagram of an implementation of a CUDA memory structure within the onboard memory on the NVIDIA® GeForce® 8 graphics processor of FIG. 11.

Referring next to FIG. 12, a block diagram of an implementation of a CUDA memory structure within the onboard memory on the GPU is illustrated. This diagram is taken from "CUDA, Supercomputing for the Masses: Part 4, The CUDA Memory Model," by Rob Farber under the High Performance Computing section of the Dr. Dobbs website, page 3 available at http://www.ddj.com/hpc-high-performancecomputing/208401741, which is hereby incorporated herein by reference. As is illustrated in FIG. 12, the texture memory area holds data that is separately readable by each thread. The global memory area is separately readable and writable by each thread. The shared memory area is simultaneously readable and 24 writable by all threads in a memory block which corresponds to a group of thread processors. The following diagrams and discussion provide context for how the methods of stereo correspondence and motion segmentation and clustering are implemented in a CUDA computer architecture environment.

Figure 13:
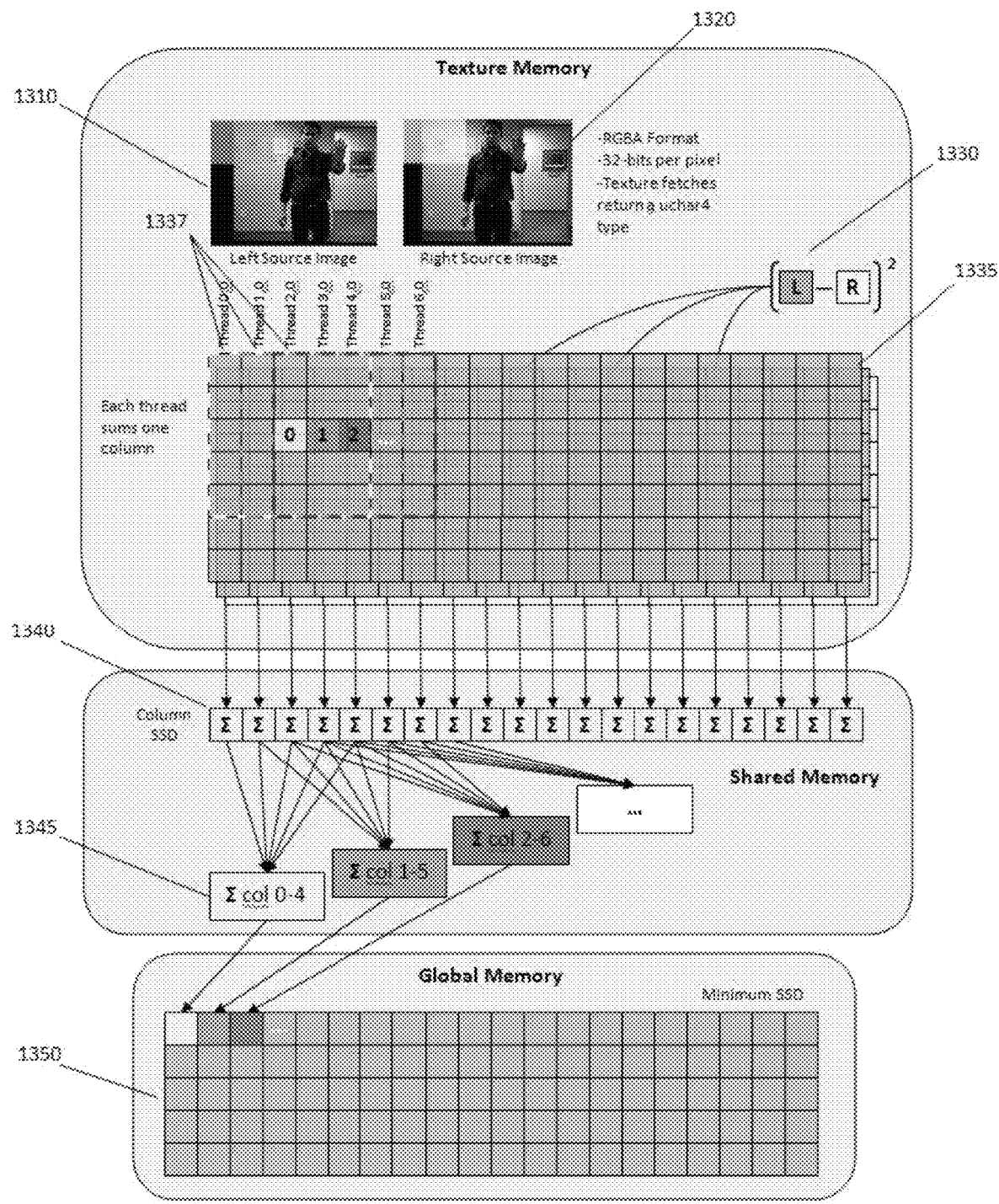
FIG. 13 is a high level view of an implementation of a portion of a method of performing stereo correspondence in CUDA in accordance with an embodiment of the present invention.

Referring to FIG. 13 a schematic of high level view of an implementation of a portion of a method of performing stereo correspondence in CUDA in accordance with an embodiment of the present invention is illustrated, the particular steps of the method being described below and making further reference to FIG. 14. As is shown in FIG. 13, the method begins by selecting one or more left window 1310 and one or more right window 1320 areas within a left image and a right image. In particular implementations of the invention, the left image and right image may be in an nVLImage format and in RGBA format with 32 bits representing each pixel. With each pair of left and right windows, each pixel in the left window may be subtracted from the each pixel in the right window and the difference squared at 1330 to form an array 1335 of squared difference values in texture memory. Each column 1337 of values in the array is then summed by a separate thread 1340 reading from the corresponding texture memory and the resulting sum stored in shared memory. Five adjacent column sum values are then added at 1345 and stored in global memory 1350 until all of the column sum values have been added. Each sum is constructed by moving right just one column sum value and adding the next five adjacent column sum values; in this way, every global memory sum value is calculated using 4 column sum values in common with each adjacent global memory sum value. The global memory sum values become the candidate SSD values for a five column wide portion of the combined left and right windows, and can be used in subsequent calculations to derive a map of disparity values.

Figure 14:
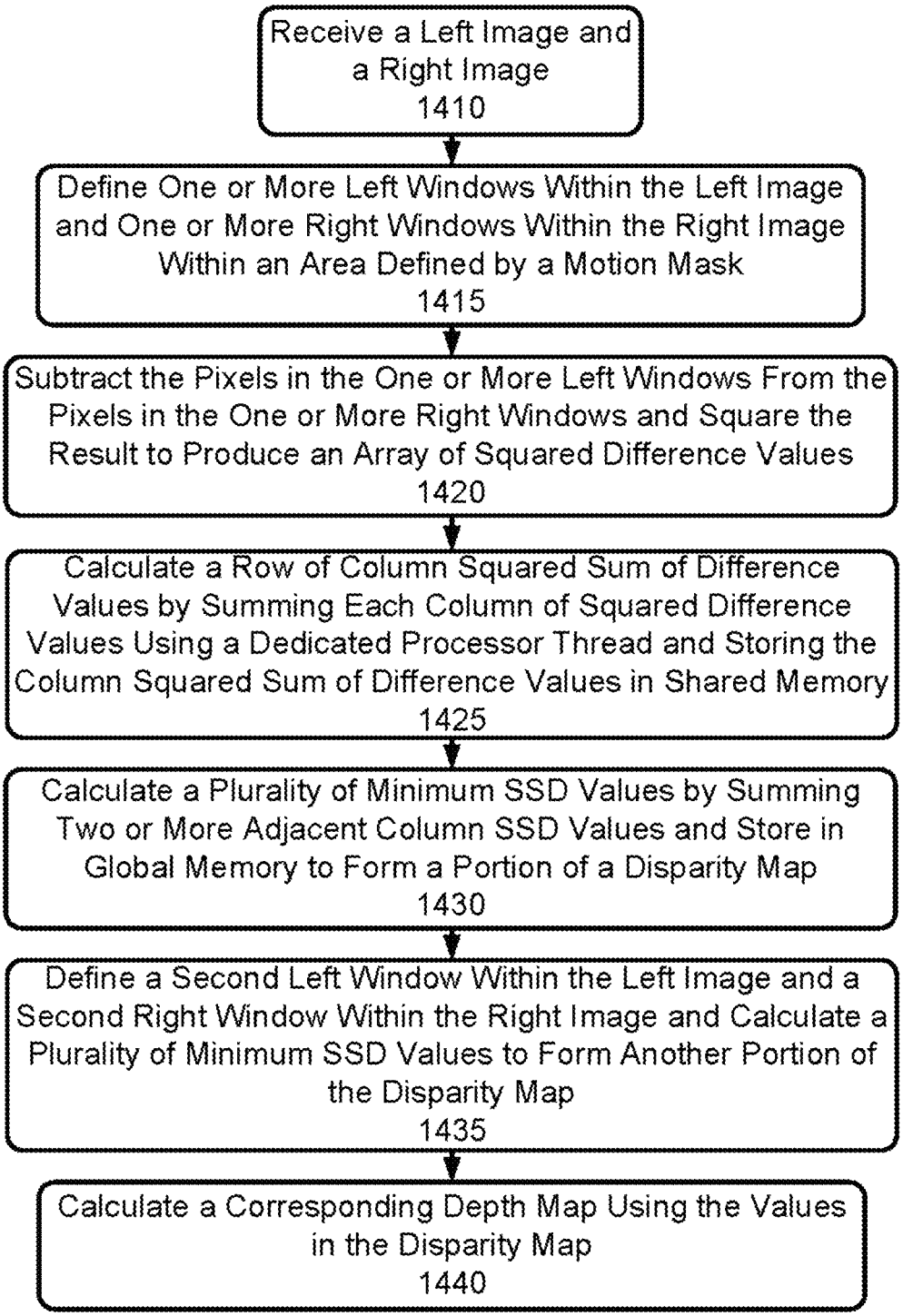
FIG. 14 is flowchart diagram depicting a method of generating a depth map in a CUDA environment in accordance with an embodiment of the invention.

Referring to FIG. 14, a method of generating a depth map in a CUDA environment in accordance with an embodiment of the invention is illustrated. As is shown in FIG. 14, the method includes at step 1410 receiving a left image and a right image, and at step 1415 defining one or more left windows within the left image and one or more right windows within the right image within an area defined by a motion mask (the motion mask being determined as described above). The method further includes in step 1420 subtracting the pixels in the one or more right windows from the pixels in the one or more left windows and squaring the result to produce an array of squared difference values. In particular embodiments of the invention, the method may operate a single window at a time while in other embodiments, all or some of the windows may be processed simultaneously from texture memory using available threads. The method may also continue processing at step 1425, and include calculating a row of column squared sum of difference values by summing each column of squared difference values using a dedicated processor thread and storing the column squared sum of difference values in shared memory. Processing may then pass to step 1430, and include calculating a plurality of minimum SSD values by summing two or more adjacent column SSD values and storing the values in global memory to form a portion of a disparity map. In particular embodiments of the invention where all of the potential windows are not simultaneously evaluated, processing may proceed to step 1435, and may include defining a second left window within the left image and a second right window within the right image and calculating a plurality of minimum SSD values and forming another portion of the disparity map. When all of the disparity map portions have been formed, the method may include at step 1440 calculating a corresponding depth map using the values in the disparity map.

For those regions within the motion mask area that are identified as having low texture, various methods of block-based median filtering and color-based clustering may be employed in accordance with the present invention, as noted above. The overall process of block-based median filtering involves performing a pixel-wise operation on the neighborhood pixels of a particular pixel and assigning the median value of the neighborhood pixels to that pixel. In the case of generating depth maps, the median disparity value calculated in the neighborhood of a pixel will be assigned to that pixel as its disparity value.

Figure 15:
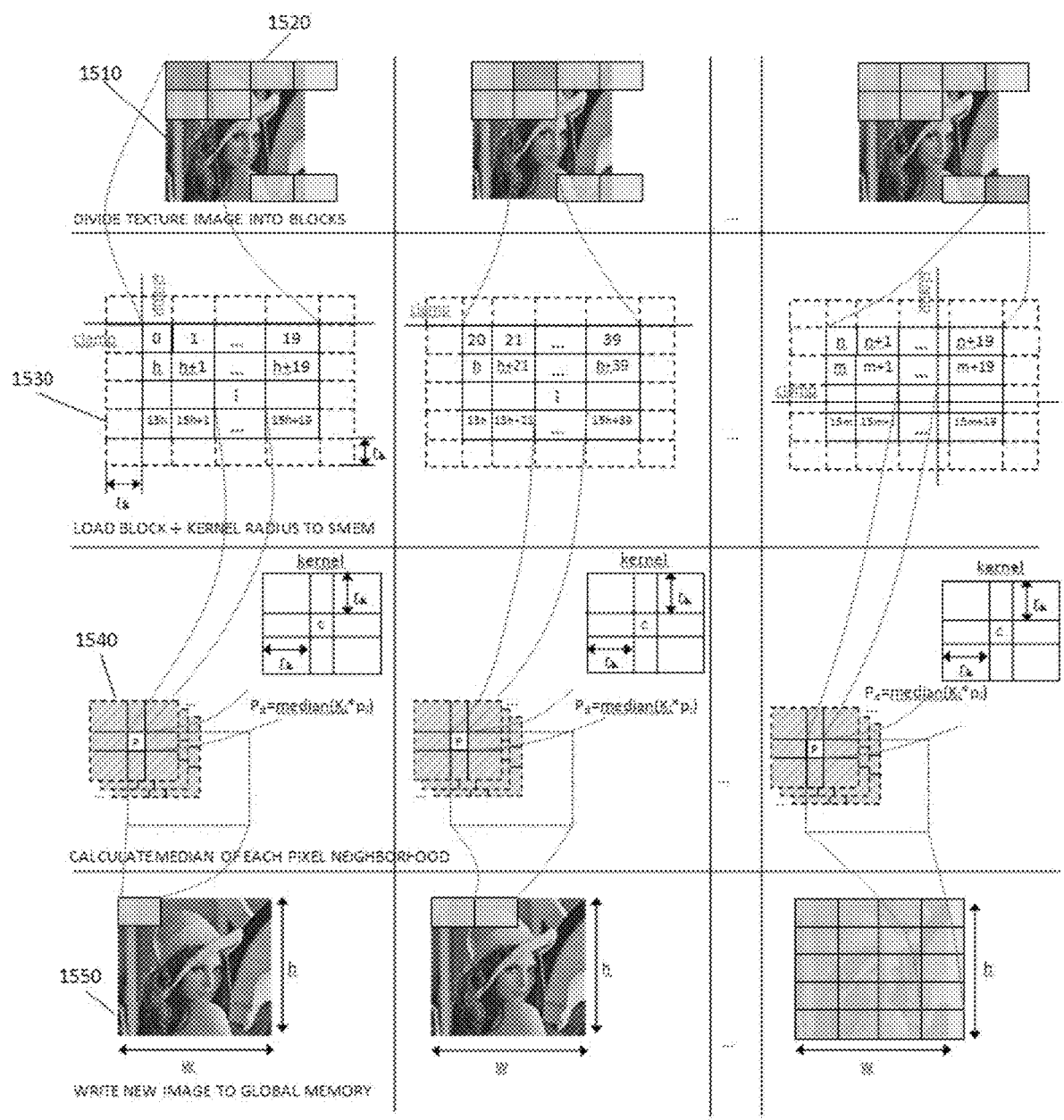
FIG. 15 is a block diagram depicting a method of implementing block-based median filtering in CUDA in accordance with an embodiment of the present invention.

Referring to FIG. 15, a method of implementing block-based median filtering in CUDA in accordance with an embodiment of the present invention is illustrated. As is shown in FIG. 15, the method preferably includes the steps of loading an image 1510 (such as the portion of the image within the motion mask area associated with a low texture region) into texture memory and dividing the texture memory associated with the image into blocks 1520. The method may also include loading the blocks and a kernel radius into shared memory at 1530 and performing a kernel operation using a plurality of thread processors on the pixels within each block to calculate the median disparity and/or depth value of the pixels within each block at 1540. The method may also include assigning all of the pixels within each block the median disparity and/or depth value and writing the resulting disparity map and/or depth map portion to global memory at 1550.

While the foregoing has dealt primarily with various implementations of methods of generating a depth map from stereo camera images, embodiments of the present invention contemplate gesture recognition systems utilizing TOF sensors to generate depth maps for use in implementations of gesture recognition methods.

Figure 16:
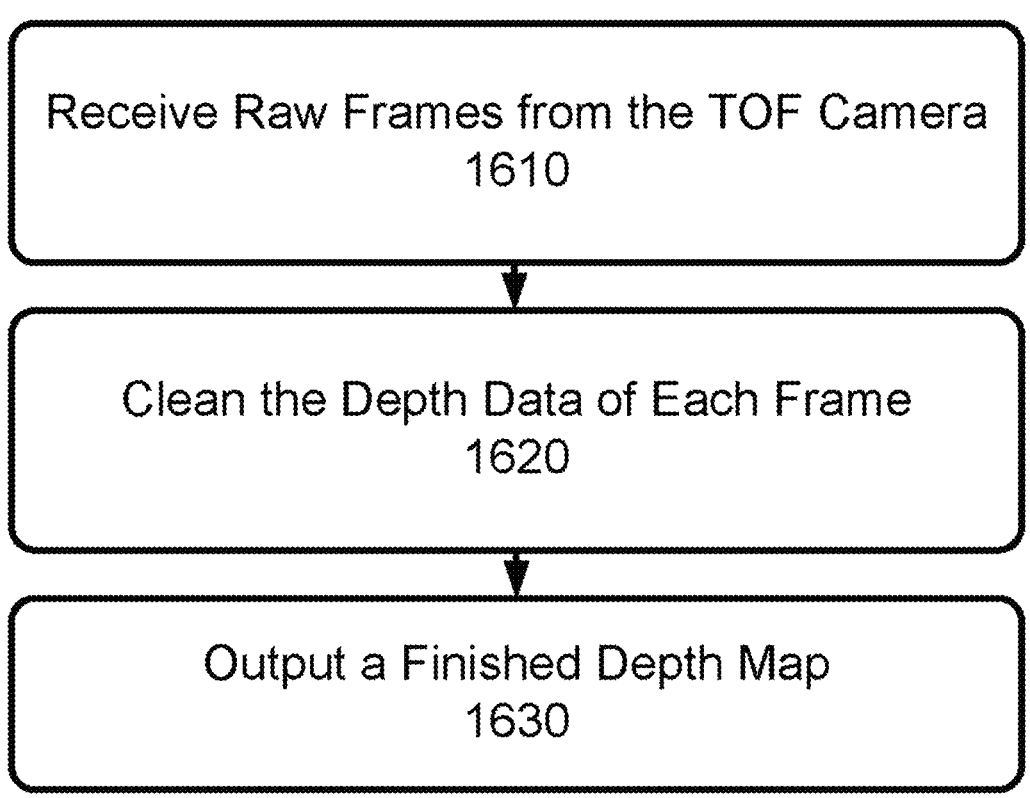
FIG. 16 is a flowchart diagram generating a depth map using a TOF sensor in accordance with an embodiment of the invention.

Referring to FIG. 16, an implementation of generating a depth map using a TOF sensor in accordance with an embodiment of the invention is illustrated. As illustrated, the method includes a first step 1610 for receiving raw frames from a TOF sensor or camera, and cleaning the depth data of each frame using any of a wide variety of filtering methods at step 1620. Finally, at step 1630 a finished depth map is output. Any of the methods and systems of gathering and processing TOF sensor data disclosed in copending U.S. patent application Ser. No. 12/784,022 noted above may be utilized in accordance with this embodiment of the invention.

Figure 17:
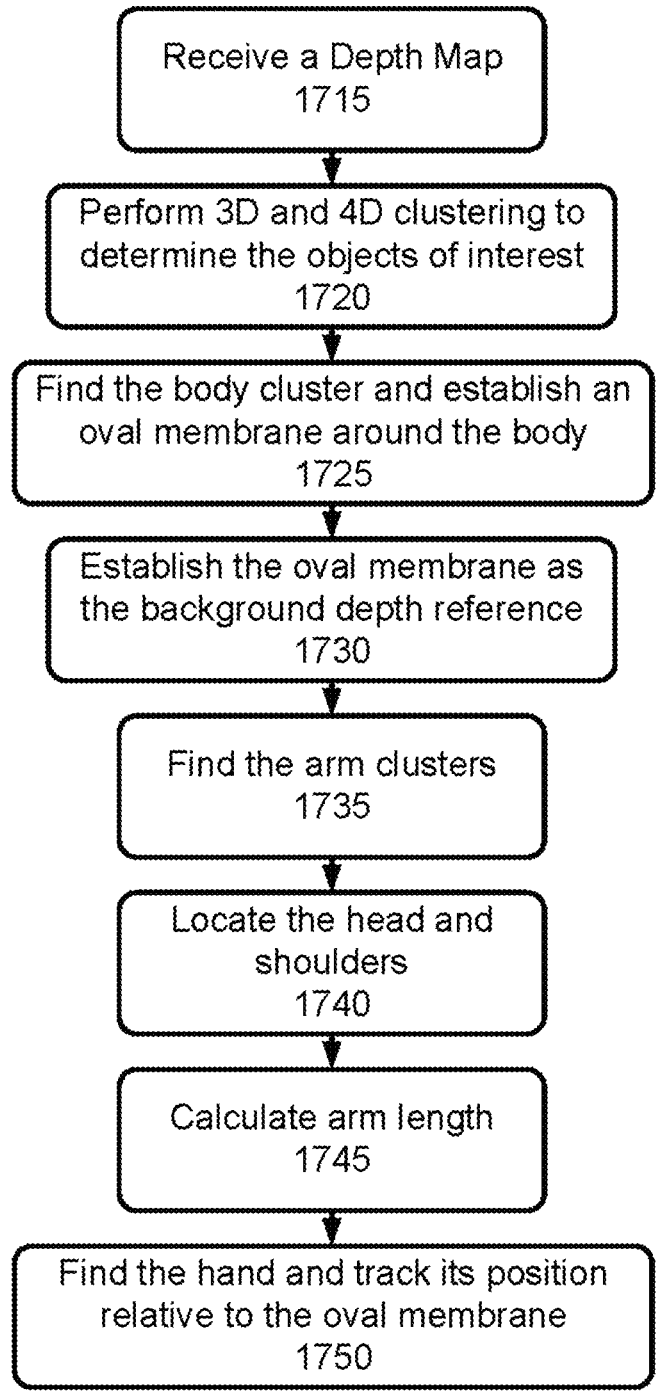
FIG. 17 is a flowchart diagram depicting a method of clustering pixels corresponding to depth information in a depth map in accordance with an embodiment of the invention.

Referring to FIG. 17, an embodiment of the invention depicting a method of clustering pixels corresponding to depth information in a depth map is illustrated. Such an embodiment of the invention including one or more clustering methods may be utilized as part of, or in conjunction with, prior embodiments of the invention including any methods of gesture recognition to aid in the gesture recognition process. As illustrated, the method may include receiving depth map from either a stereo camera or TOF source generated using any of the methods presented in accordance with this invention at step 1715 and performing three-dimensional (3D) and four-dimensional (4D) clustering to determine objects of interest within the depth map at step 1720. The clustering process broadly seeks to group pixels with depth values corresponding with particular discrete objects together, thus separating the clustered pixels from the background depth values within the depth map. Time may be used to help establish the contours of a particular cluster via its movement in two or more depth maps.

With one or more clusters identified, the method may include finding a cluster corresponding with the user's body (or major portion of the body, such as a torso or face, depending upon the implementation), or other portion of another type of user actuator, and establishing an oval membrane around the body cluster at step 1725. The method may also include establishing the oval membrane as the background depth reference from which all other body portions will be tracked at step 1730. The method may then include, at step 1735, finding the arm clusters, at step 1740, locating the head and shoulders, at step 1745 calculating arm length, and finally at step 1750, finding a hand and tracking its position relative to the oval membrane. A wide variety of techniques can be employed to find and/or calculate the arm length such as, by non-limiting example, various biometric methods, databases of common human proportion values, and other methods, algorithms, and/or databases.

Implementations of one or more clustering methods presented in accordance with the present invention may be implemented in CUDA. A non-limiting example of an embodiment of the invention including an implementation of a clustering method in CUDA will now be described. In this implementation, a map of cluster numbers is created that is updated as clusters merge through an agglomeration process. Three stages may be utilized by the algorithm. These stages are implemented in three kernels to allow the cluster map to be copied into texture memory after each stage.

Three different clustering methods of many possible methods may be implemented and employ the following clustering stages of the invention. A first clustering method of the invention may treat the image as binary with no additional constraints beyond the 2D spatial window. Another clustering method may utilize the absolute difference in grayscale values (and thus depth values) as a distance metric according to Equation 2. Color-based clustering may be implemented by a third method in accordance with the invention which uses an RGB Euclidean distance metric according to Equation 3.

$$\Delta I = |I_1 - I_2| \quad (2)$$

$$\Delta C = \sqrt{(C_{r,1} - C_{r,2})^2 + (C_{g,1} - C_{g,2})^2 + (C_{b,1} - C_{b,2})^2} \quad (3)$$

Figure 18:
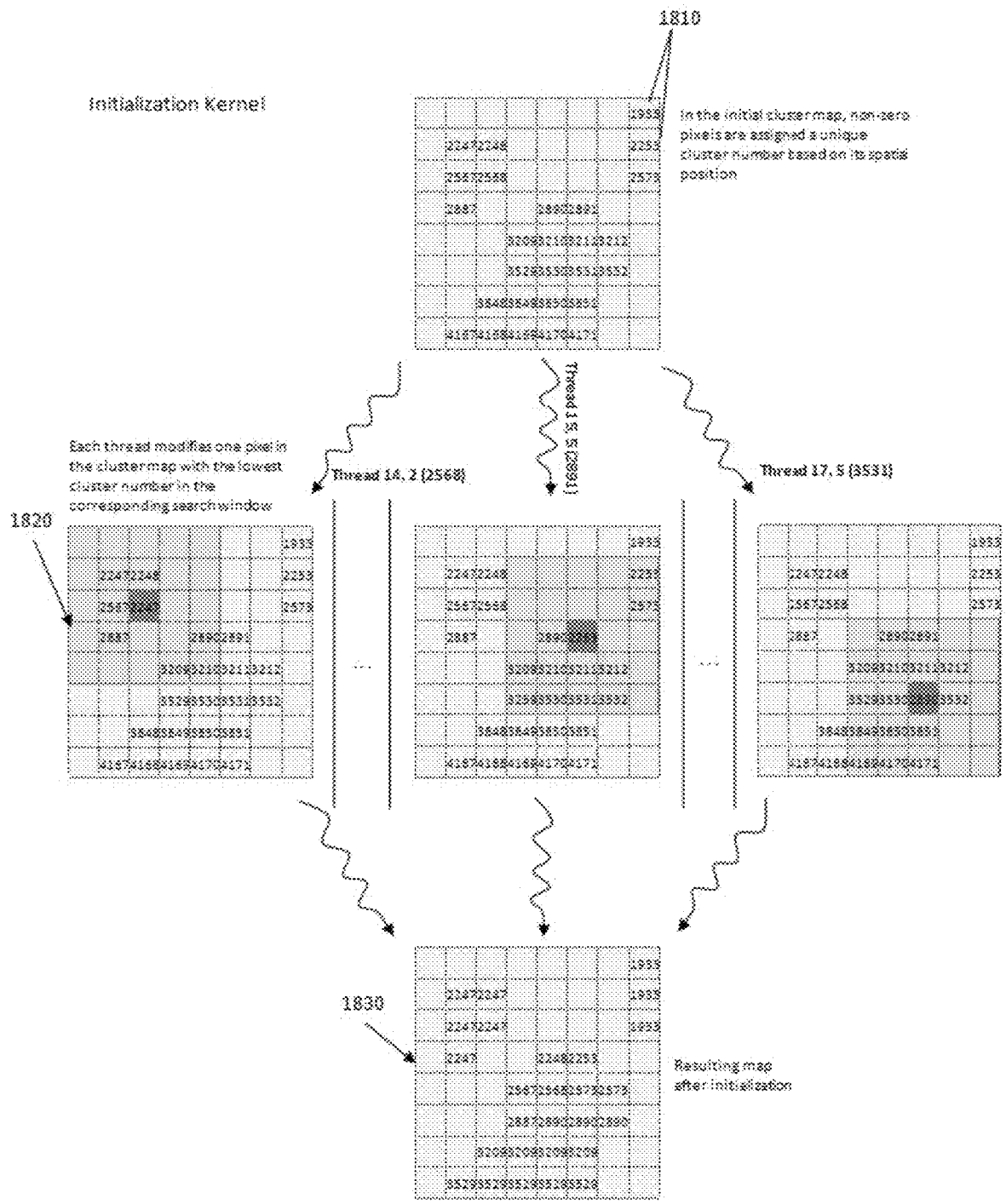
FIG. 18 is a block diagram depicting a first initialization stage of a clustering process in accordance with an embodiment of the invention.

Referring to FIG. 18, a first stage of the clustering process in accordance with an embodiment of the invention is shown, and comprises an initialization stage during which each pixel in the cluster map is assigned a unique numerical identifier 1810 which is also used as a spatial coordinate. Each spatial coordinate is an initial unique numerical identifier assigned as though the image were unraveled into consecutive pixels, in ascending order from top to bottom and left to right. At this point, the numerical identifier and the cluster number are the same for each pixel. An initial clustering step is performed at step 1820 for each pixel. The lowest cluster number of any neighboring pixel within a specified 2D window that meets desired non-spatial constraints such as, by non-limiting example, intensity, color, or any other pixel characteristic, is stored in the cluster map in place of the current cluster number. A resulting cluster map is provided at 1830.

Figure 19:
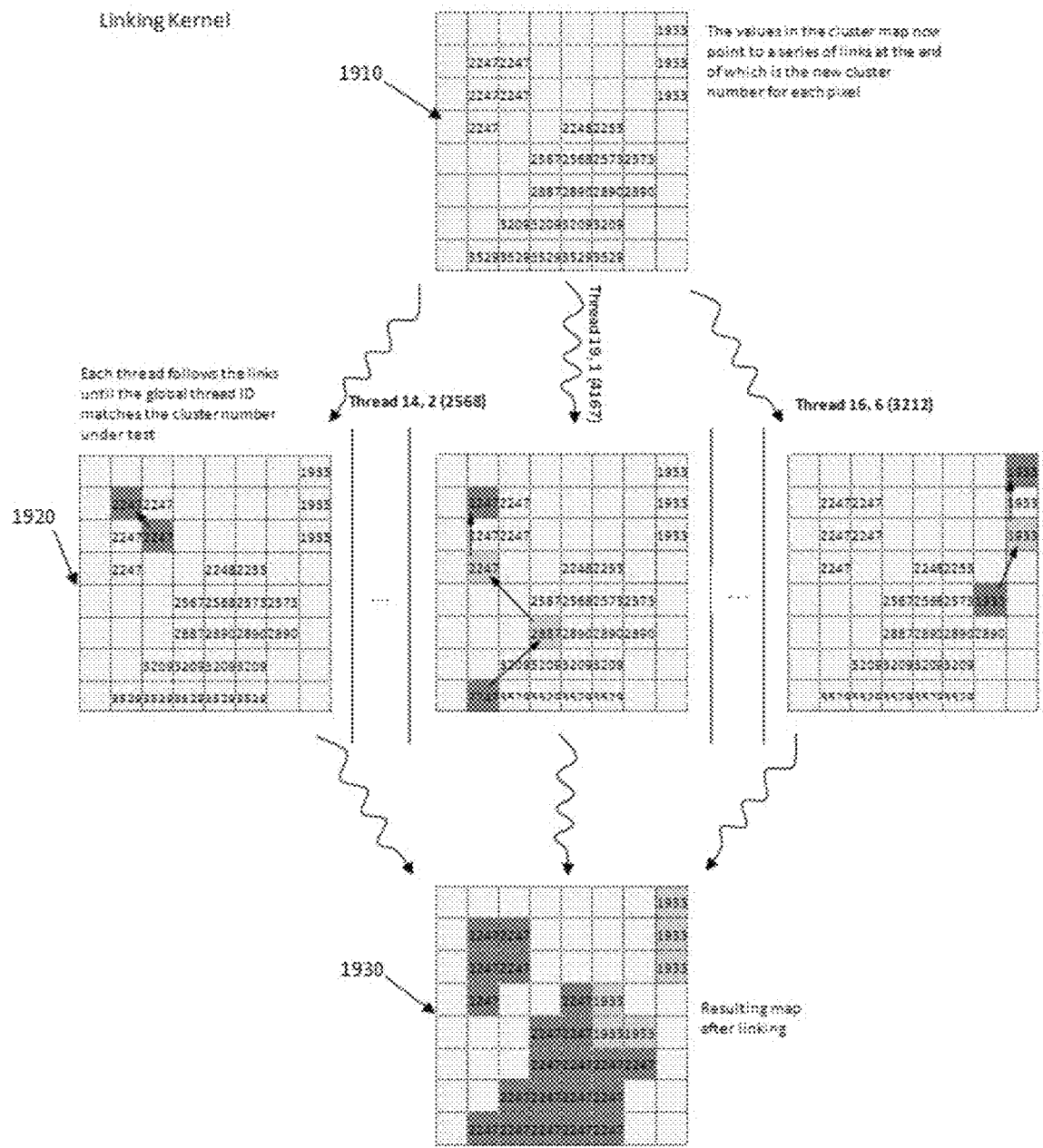
FIG. 19 is a block diagram depicting a second linking kernel implementation stage of a clustering process in accordance with an embodiment of the invention.

During a second stage or a linking stage depicted in accordance with an embodiment of the invention at FIG. 19, the cluster number associated with each pixel is read into a memory register at 1910. The spatial coordinate (which is unchanged and will remain unchanged) is also read in for the pixel. The two values are compared at step 1920. If the cluster number for the pixel is different from the spatial coordinate for the pixel, then the cluster number is tracked back (or linked) to a previous pixel whose spatial coordinate actually matches that cluster number. If there is no match, the tracking process is repeated for the pixel until a cluster number (or numerical identifier) is found that matches the spatial coordinate in the map. This final value is then written to the cluster map for the pixel being evaluated at step 1930.

Figure 20:
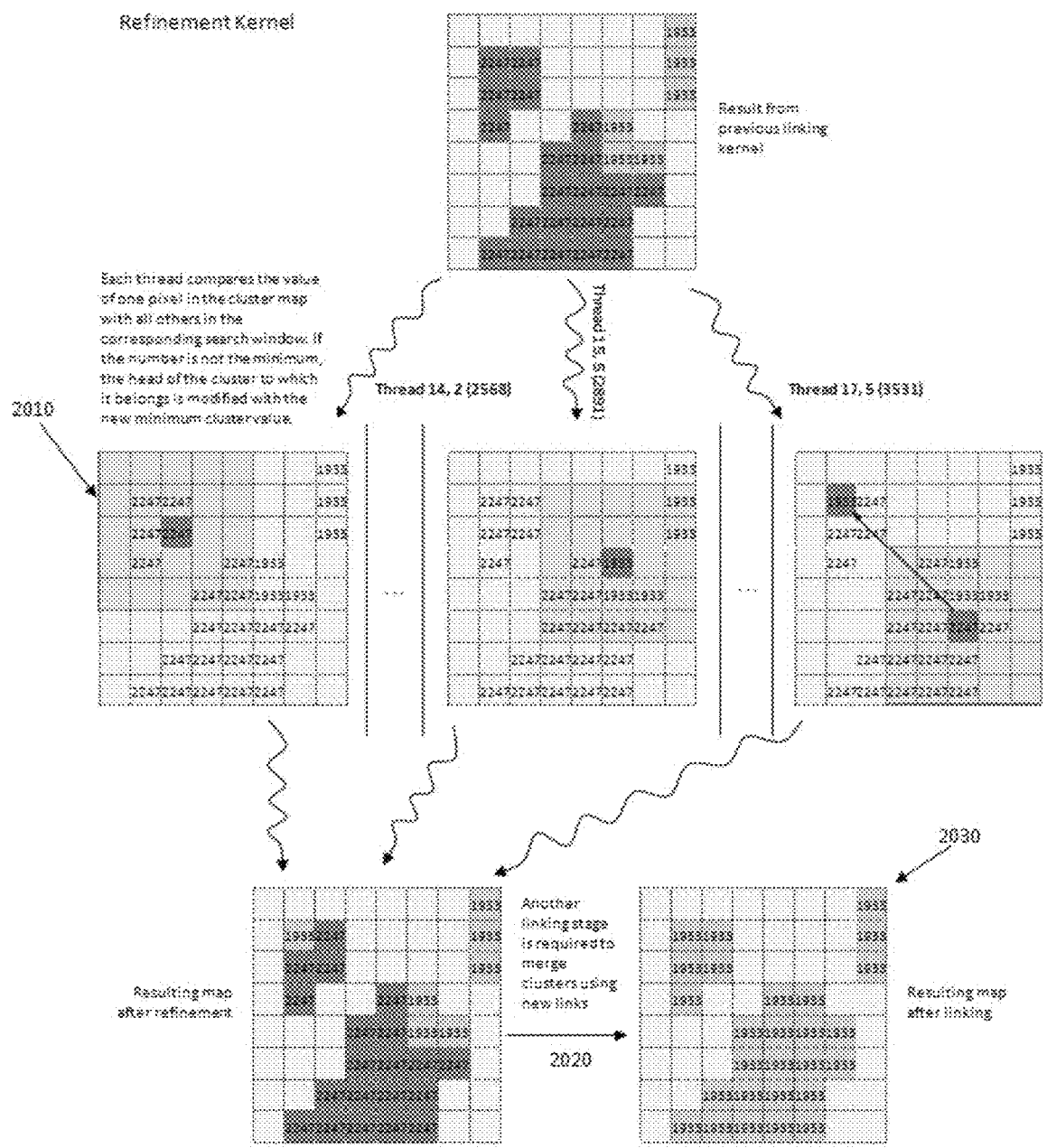
FIG. 20 is a block diagram depicting a third refinement stage of a clustering process in accordance with an embodiment of the invention.

Referring finally to FIG. 20, a third stage, or a refinement stage is depicted in accordance with an embodiment of the present invention. As is show in FIG. 20, a refinement kernel is invoked at step 2010, followed by updating cluster values to reflect the lower cluster numbers in a linking stage 2020, and finally a resulting map after linking is generated at step 2030, and is input to other aspects of the invention adapted to employ such a map. The refinement kernel thus reevaluates neighboring pixels using the same clustering constraints for each pixel and stores the lowest cluster number of the matching pixels. Both the linking and refinement kernels are run iteratively until the cluster map converges. Typically, three to four iterations may be required for convergence at step 2030.

Any of a wide variety of combinations of specific clustering methods and clustering stages is possible using the principles disclosed in accordance with this invention. In addition, the stages may be implemented in any order, iteratively performed, and repetitively performed depending upon the constraints of the clusters and the desired outcome. Also, implementations of the method of clustering described above may be utilized for clustering pixels based on any desired value expressed by and/or represented by a pixel, such as, by non-limiting example, depth, color, texture, intensity, chromaticity, or other pixel characteristic.

Once the finished depth maps have been produced by an implementation of a depth estimation system utilizing stereoscopic cameras or by an implementation of a depth estimation system using a TOF camera or sensor as described in accordance with one or more embodiments of this invention, various implementations of methods of gesture recognition can be used in accordance with additional embodiments of the invention. These methods may allow the computer to determine whether the user is making a static or a dynamic gesture. A static gesture may be a particular orientation of the hand or arm. Static gestures include orientations of the hand or arm that are recognized when the hand or arm forms a pattern that does not include a movement (such as many American Sign Language signs). Dynamic gestures include orientations of the hand or arm that are recognized when the hand, fingers, palm, wrist, or arm move in a particular orientation, perform a defined action, or make a defined movement. Based on whether the gesture, either static or dynamic, is recognized, the computer may preferably execute an instruction, process, or code associated with the gesture through a gesture library or database, and display results on a display or perform other resulting actions.

Figure 21:
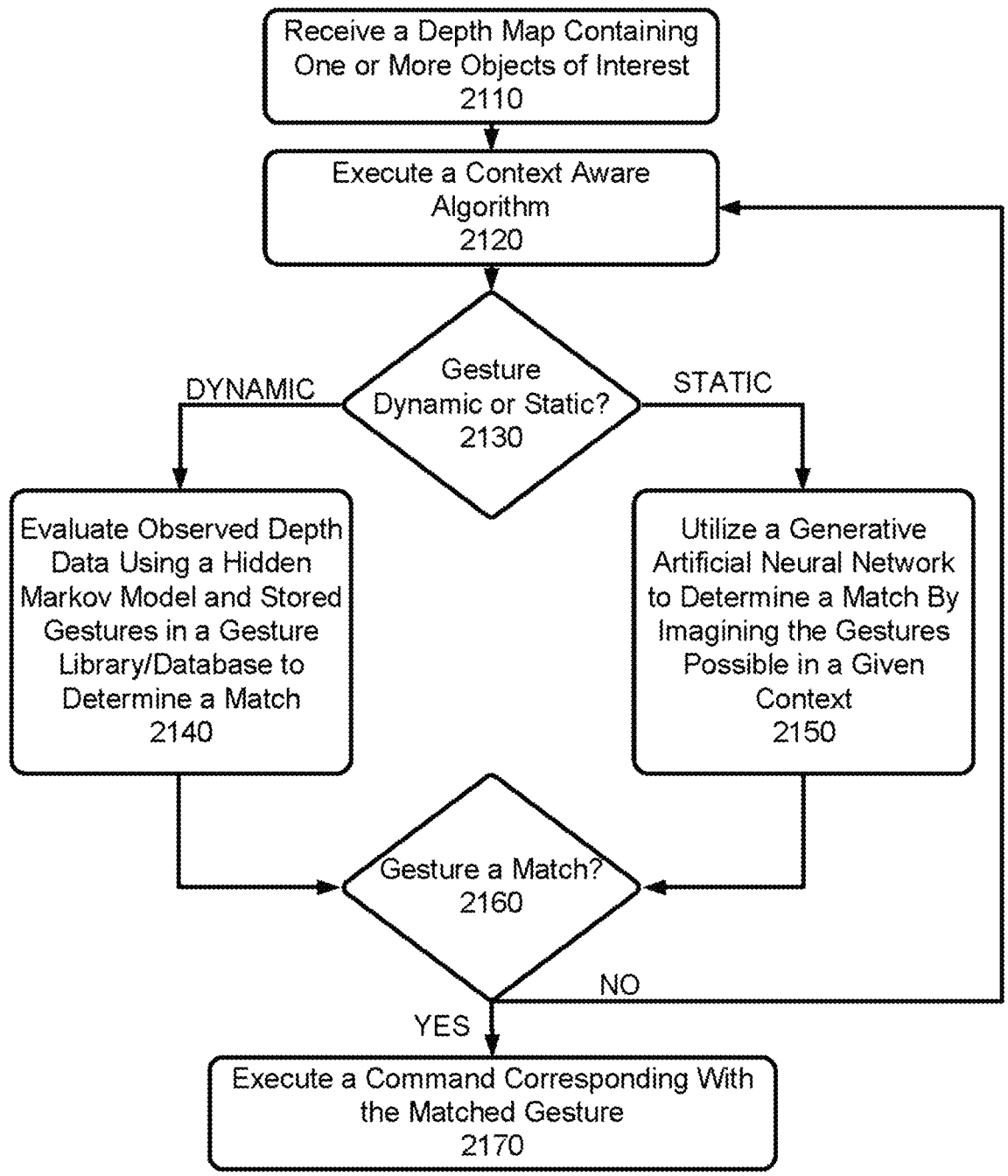
FIG. 21 is a flowchart diagram depicting a method of gesture recognition in accordance with an embodiment of the invention.

Referring to FIG. 21, an embodiment of the invention presenting a method of gesture recognition is illustrated. Beginning with the finished depth map frames produced by a gesture recognition system at step 2110, the method includes executing a next step 2120 employing a context-aware algorithm. Context aware algorithms may be used when a particular screen is visible on the display, or in other appropriate situations. For example, the person may be making gestures to interact with one of three buttons on the display; in such an example, an implementation of a context-aware algorithm may tell the computer executing the method that only gestures that are associated with button selection should be looked for or recognized and the locations or areas in which the computer should look for user motion in order to ensure the desired button has been pressed. Any of a wide variety of context-aware algorithms may be executed, including, by non-limiting example, algorithms designed to adapt the operation of the gesture recognition system for various use situations or conditions, algorithms designed for interface specific changes, or any other desired method of limiting or specifying the gestures capable of executing or selecting a command in a particular situation.

At step 2130, the method may then determine whether the depth data in one or more of the frames includes a gesture that is determined likely to be static or dynamic. A wide variety of methods may be used to make the decision, including, by non-limiting example, a time requirement, recognition of movement within a particular time interval, identification that particular hand features are visible within a frame, or any other method of determining whether the gesture is executed in a fixed or a moving fashion. If the gesture is determined to be dynamic at step 2130, the processing passes to step 2140, and the resulting set of depth data frames that contain the gesture (or portions of the set of frames containing the gesture) are may be evaluated using a hidden Markov model and stored gestures in a gesture library or database to determine the likelihood of a match. Implementations of gesture libraries or databases may include video segments or maps of the movement of particular points of the hand through time to enable the hidden Markov model to determine whether what stored gestures in the database could have been produced by the observed gesture. An example of a type of hidden Markov model that may be used with implementations of the method may be found in the article by S. Rajko, et al., "HMM Parameter Reduction for Practice Gesture Recognition," Proceedings of the International Conference on Automatic Gesture Recognition (September 2008) which is incorporated entirely herein by reference. If the gesture is determined to be a match at step 2160, then the computer may execute a command or instruction corresponding with the matched gesture at step 2170, in the context of the context-aware algorithm.

If the observed gesture is determined at step 2150 to be a static gesture, then implementations of the method may utilize a generative artificial neural network to determine whether the gesture matches one included in a gesture database. In particular implementations, the network may operate by imagining the gestures possible in the given context (using inputs from the context-aware algorithm in some implementations). If the network determines that a match exists at step 2160, then at step 2170 a command or instruction may be executed in accordance therewith. Examples of implementations of generative artificial neural networks that may be utilized may be found in the article to Geoffrey Hinton, et al., entitled "A Fast Learning Algorithm for Deep Belief Nets," Neural Computation, v. 18 p. 1527-1554, the disclosure of which is hereby entirely incorporated herein by reference. Particular implementations in accordance with the invention may utilize deep belief networks. In accordance with one or more embodiments of the present invention, many modifications have been made to this network, specifically, in its over topology and architecture, such that the network is suited for gesture recognition.

Figure 22:
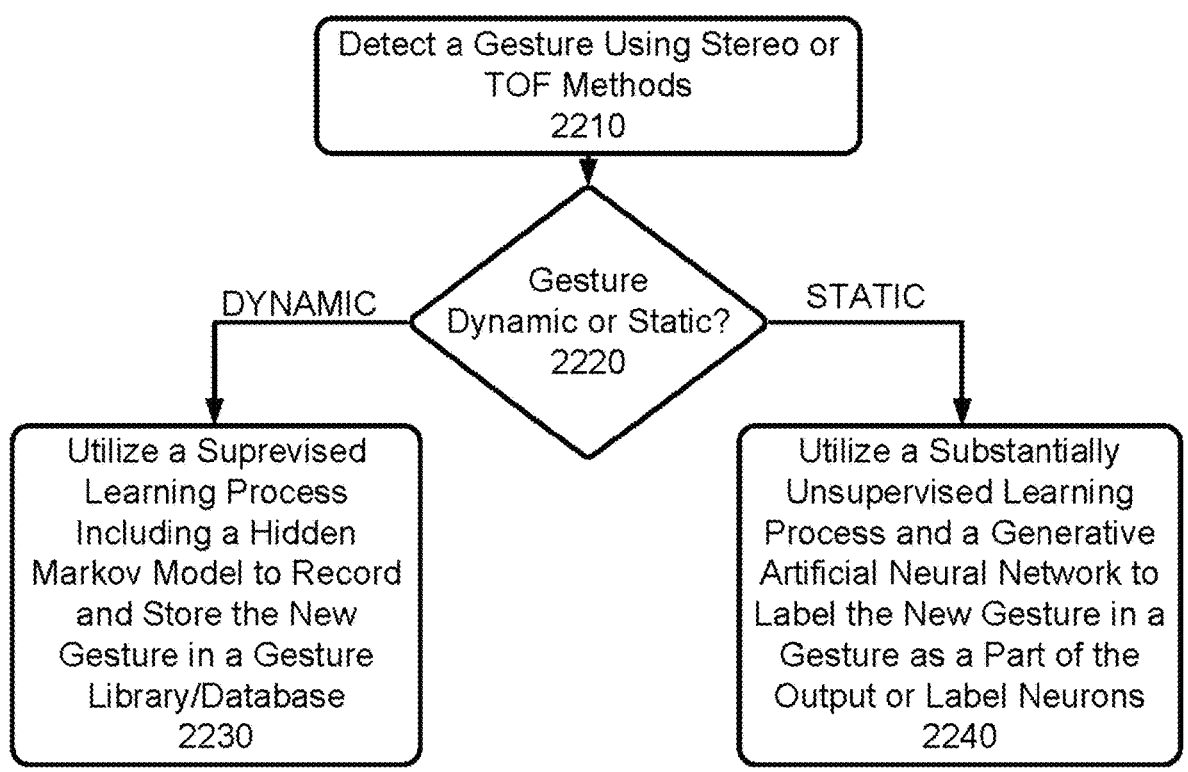
FIG. 22 is a flowchart diagram depicting a method of gesture learning in accordance with an additional embodiment of the invention.

Referring to FIG. 22, an implementation of a method of gesture learning in accordance with an additional embodiment of the invention is illustrated. The method generally may be implemented under several circumstances: when a user desires to associate a new dynamic or static gesture with a specific command or instruction, when the gesture recognition system is "learning" a new user and observing the way that the particular user executes gestures, or during a setup routine when implementations of gesture recognition systems are undergoing quality checks and/or initial machine learning exercises. The method preferably begins at step 2210 with the detection of a gesture by the person being observed by either a stereoscopic camera system or a TOF camera. The method then continues at step 2220 and determines whether the gesture is a dynamic gesture or static gesture using any of the methods described above in accordance with this invention. If the gesture is determined to be dynamic, processing passes to step 2230 where a supervised learning process that includes using a hidden Markov model to record and store the new gesture in a gesture library/database is carried out.

If it is instead determined at step 2220 that the gesture is static, then processing alternatively passes to step 2240 where a generally unsupervised learning process may be implemented in combination with an implementation of a generative artificial neural network to record and store the new gesture. The particular generative artificial neural network used may be any previously presented in accordance with the invention.

Once the observed gesture has been recorded and stored, the method may also alternatively include associating the learned gesture with a particular context-aware algorithm and/or inputting or associating the instructions or steps that should be executed by the computer when the gesture is observed. Additional context-aware algorithms may be created in particular implementations of the present invention. Any of a wide variety of other application-specific information may also be input or associated with the gesture and/or the context-aware algorithm, depending upon what the command or instruction the gesture is associated with requires for execution.

Therefore, in accordance with the present invention, as can be seen, implementations of the described gesture recognition systems and related methods may have the following advantages, among any number of advantages:

Using CUDA to create a massively multithreaded application to process image data on a multi-cored GPU may enable use of very inexpensive stereo camera equipment while still providing depth map data of sufficient quality. The use of hidden Markov and generative artificial neural networks for gesture recognition and learning in combination with real time or near real time depth map information may enable accurate gesture recognition without requiring artificial user posing or positioning.

The materials used for the described embodiments of the invention for the implementation of gesture recognition systems may be made of conventional materials used to make goods similar to these in the art, such as, by non-limiting example, plastics, metals, semiconductor materials, rubbers, glasses, and the like. Those of ordinary skill in the art will readily be able to elect appropriate materials and manufacture these products from the disclosures provided herein.

The implementations listed here, and many others, will become readily apparent from this disclosure. From this, those of ordinary skill in the art will readily understand the versatility with which this disclosure may be applied.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

What is claimed:

1. A method for executing a command, comprising
receiving a depth map comprising one or more objects of interest contained therein;
executing a context aware algorithm defining one or more commands corresponding to one or more gestures corresponding to a particular situation or condition, where the allowable input gestures are limited in accordance with the particular situation or condition and associated with a given user;
identifying in a depth map a particular gesture that comprises either one of a static or a dynamic gesture;
evaluating the observed depth data obtained from the received depth map according to at least in part one or more artificial neural network and one or more stored gestures for the given user to determine a match when the gesture is identified to be static;
using a hidden markov model to determine a match when the gesture is identified to be dynamic; and
comparing the resulting data and one or more gestures stored in a gesture library for the given user to determine a match therebetween.

2. The method of claim 1, further comprising the step of executing a command in accordance with the matched gesture.

3. The method of claim 1, wherein the depth map is generated in accordance with a time of flight image acquisition system.

4. The method of claim 1, wherein the depth map is generated in accordance with a stereo image acquisition system.

5. A method for teaching a system to recognize a gesture, comprising:
receiving a depth map comprising one or more objects of interest contained therein;
identifying in a depth map a particular gesture that comprises either one of a static or a dynamic gesture;
utilizing an unsupervised learning process to store a new gesture for a given user in a gesture library when the gesture is identified to be static;
utilizing a supervised learning process to store a new gesture for the given user in the gesture library when the gesture is identified to be dynamic; and
associating one or more of the new gestures for the given user with one or more corresponding context aware algorithms in order to limit the input of gestures in accordance with a particular situation or condition associated with the given user.

6. The method of claim 5, wherein the supervised learning process comprises at least in part a hidden markov model.

7. The method of claim 5, wherein the unsupervised learning process comprises at least in part a generative artificial neural network.

8. The method of claim 5, wherein the depth map is generated in accordance with a time of flight image acquisition system.

9. The method of claim 5, wherein the depth map is generated in accordance with a stereo image acquisition system.

10. A system for executing a command, comprising
a camera for receiving one or more images of one or more objects of interest contained therein;
a storage device for storing a gesture library therein;
a processor for generating a depth map in accordance with at least the received one or more images containing the one or more objects of interest therein, executing a context aware algorithm defining one or more commands corresponding to one or more gestures, identifying in a depth map a particular gesture that comprises either one of a static or a dynamic gesture corresponding to a particular situation or condition associated with a given user, where the allowable input gestures are limited in accordance with the particular situation or condition and for the given user, when the gesture is identified to be static, evaluating the observed depth data obtained from the received depth map according to at least in part one or more of an artificial neural network and one or more stored gestures associated with the given user to determine a match, when the gesture is identified to be dynamic, using a hidden markov model to determine a match, and comparing the resulting data and one or more gestures associated with the given user stored in the gesture library to determine a match therebetween.

11. The system of claim 10, wherein the processor further executes a command in accordance with the matched gesture.

12. The system of claim 10, wherein the depth map is generated in accordance with a time of flight image acquisition system.

13. The system of claim 10, wherein the depth map is generated in accordance with a stereo image acquisition system.

14. A system for teaching a system to recognize a gesture, comprising:
a camera for receiving one or more images of one or more objects of interest contained therein;
a processor for generating a depth map in accordance with at least the received one or more images containing the one or more objects of interest therein, identifying in a depth map a particular gesture that comprises either one of a static or a dynamic gesture, and when the gesture is identified to be static, utilizing an unsupervised learning process to store a new gesture for a given user in a gesture library stored to a recording medium, when the gesture is identified to be dynamic, utilizing a supervised learning process to store a new gesture for the given user in the gesture library, and associating one or more of the new gestures for the given user with one or more corresponding context aware algorithms in order to limit the input of gestures accordance with a particular situation or condition associated with the given user.

15. The system of claim 14, wherein the supervised learning process comprises at least in part a hidden markov model.

16. The system of claim 14, wherein the unsupervised learning process comprises at least in part a generative artificial neural network.

17. The system of claim 14, wherein the depth map is generated in accordance with a camera comprising a time of flight image acquisition system.

18. The system of claim 14, wherein the depth map is generated in accordance with a camera comprising a stereo image acquisition system.

* * * * *